US012769692B2

(12) United States Patent
Files et al.

(10) Patent No.: US 12,769,692 B2
(45) Date of Patent: Oct. 20, 2026

(54) MANAGING CLIENT INFORMATION HANDLING SYSTEM (IHS) ACCESS TO COMPONENTS OF A MODULAR ARTIFICIAL INTELLIGENCE (AI) APPLIANCE

(71) Applicant: Dell Products L.P., Round Rock, TX (US)

(72) Inventors: Jace W. Files, Round Rock, TX (US); Gerald Rene Pelissier, Santa Clara, CA (US); John Trevor Morrison, Round Rock, TX (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 71 days.

(21) Appl. No.: 19/021,492

(22) Filed: Jan. 15, 2025

(65) Prior Publication Data

US 2026/0203238 A1 Jul. 16, 2026

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01)

(58) Field of Classification Search
CPC .......................... G06F 13/4027; G06F 13/4282
See application file for complete search history.

(56) References Cited

U.S. PATENT DOCUMENTS

2016/0098876 A1* 4/2016 Oz .......................... G01S 19/14 340/5.61
2016/0344629 A1* 11/2016 Gray ..................... H04L 49/106

* cited by examiner

*Primary Examiner* — Henry Tsai
*Assistant Examiner* — John B Roche
(74) *Attorney, Agent, or Firm* — Fogarty LLP

(57) ABSTRACT

Systems and methods for managing client IHS access to components of a modular Artificial Intelligence (AI) appliance are described. In an illustrative, non-limiting embodiment, an AI appliance may include: a floor module comprising an AI accelerator; and a base module coupled to the floor module, the base module having a Systems-on-Chip (SoC) and a memory coupled to, or integrated into, the SoC, where the memory includes program instructions stored thereon that, upon execution by the SoC, cause the SoC to: establish a connection with a client IHS via a local port; and control the client IHS's access to an AI accelerator.

20 Claims, 21 Drawing Sheets

100

103

400

600

500

700

800

1000

900

1100

1300

1200

1500

1400

1700

1600

1800

1900

2000

2100

2200

2300

2400

2500

2600

2700

MANAGING CLIENT INFORMATION HANDLING SYSTEM (IHS) ACCESS TO COMPONENTS OF A MODULAR ARTIFICIAL INTELLIGENCE (AI) APPLIANCE

FIELD

This disclosure relates generally to Information Handling Systems (IHSs), and more specifically, to systems and methods for managing client IHS access to components of a modular Artificial Intelligence (AI) appliance.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for managing client IHS access to components of a modular Artificial Intelligence (AI) appliance are described. In an illustrative, non-limiting embodiment, an AI appliance may include: a floor module comprising an AI accelerator; and a base module coupled to the floor module, the base module having a Systems-on-Chip (SoC) and a memory coupled to, or integrated into, the SoC, where the memory includes program instructions stored thereon that, upon execution by the SoC, cause the SoC to: establish a connection with a client IHS via a local port; and control the client IHS's access to an AI accelerator.

For example, the AI accelerator may include at least one of: a Graphics Processing Unit (GPU), a Neural Processing Unit (NPU), a Field-Programmable Gate Array (FPGA), an Application-Specific Integrated Circuit (ASIC), or a Tensor Processing Unit (TPU). In some cases, the AI appliance may be part of a docking station.

The local port may include at least one of: a Universal Serial Bus (USB), Thunderbolt, Ethernet, or wireless controller. To control the client IHS's access to the AI accelerator, the program instructions, upon execution by the SoC, may cause the SoC to configure a crossbar to provide the client IHS with direct access to the AI accelerator. Additionally, or alternatively, to control the client IHS's access to the AI accelerator, the program instructions, upon execution by the SoC, may cause the SoC to configure the crossbar to stop the direct access and provide the client IHS with indirect access to the AI accelerator through the SoC.

The AI appliance may include a top floor coupled to the base floor, where the top floor comprises a controller, and where the program instructions, upon execution by the SoC, cause the SoC to configure a bridge to provide the client IHS with direct access to the controller. To control the client IHS's access to the AI accelerator, the program instructions, upon execution by the SoC, may cause the SoC to configure the bridge to stop the direct access and provide the client IHS with indirect access to the controller through the SoC. In some cases, the top floor may include a loudspeaker and a microphone, and the controller may be configured to interface with the loudspeaker and the microphone during a conference call.

To control the client IHS's access to the AI accelerator, the program instructions, upon execution by the SoC, may cause the SoC to evaluate a context-based policy provided by an Information Technology Decision Maker (ITDM).

Additionally, or alternatively, to control the client IHS's access to the AI accelerator, the program instructions, upon execution by the SoC, cause the SoC to access a catalog of AI appliances provided by an orchestrator in communications with a plurality of AI appliances. Additionally, or alternatively, to control the client IHS's access to the AI accelerator, the program instructions, upon execution by the SoC, cause the SoC to execute a routing command provided by an orchestrator in communications with a plurality of AI appliances. The program instructions, upon execution, may also cause the SoC to execute route a display signal from the SoC to a display coupled to the AI appliance via the local port.

In another illustrative, non-limiting embodiment, a method may include providing an AI appliance comprising an SoC, an AI accelerator coupled to the SoC, and a memory coupled to, or integrated into, the SoC, where the memory comprises program instructions stored thereon that, upon execution by the SoC, cause the SoC to establish a connection with a client IHS via a local port; and routing a display signal from the SoC to a display coupled to the AI appliance via the local port.

The method may include configuring a crossbar to provide the client IHS with direct access to the AI accelerator. The method may also include configuring the crossbar to stop the direct access and provide the client IHS with indirect access to the AI accelerator through the SoC. The method may further include configuring a bridge to provide the client IHS with direct access to the controller. Additionally, or alternatively, the method may include configuring the bridge to stop the direct access and provide the client IHS with indirect access to the controller through the SoC.

In yet another illustrative, non-limiting embodiment, a hardware memory device may have program instructions stored thereon that, upon execution by an SoC of an AI appliance, the AI appliance comprising two or more discrete AI accelerators, cause the SoC to: establish a connection with a client Information Handling System (IHS) via a local port; control, by the SoC, a client IHS's access to the two or more discrete AI accelerators; and route a display signal from the SoC to a display coupled to the AI appliance via the local port.

To control the client IHS's access to the AI accelerator, the program instructions, upon execution by the SoC, may cause the SoC to at least one of: evaluate a context-based policy provided by an ITDM; (b) access a catalog of AI appliances provided by an orchestrator in communications with a plurality of AI appliances; or (c) execute a routing command provided by an orchestrator in communications with a plurality of AI appliances.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
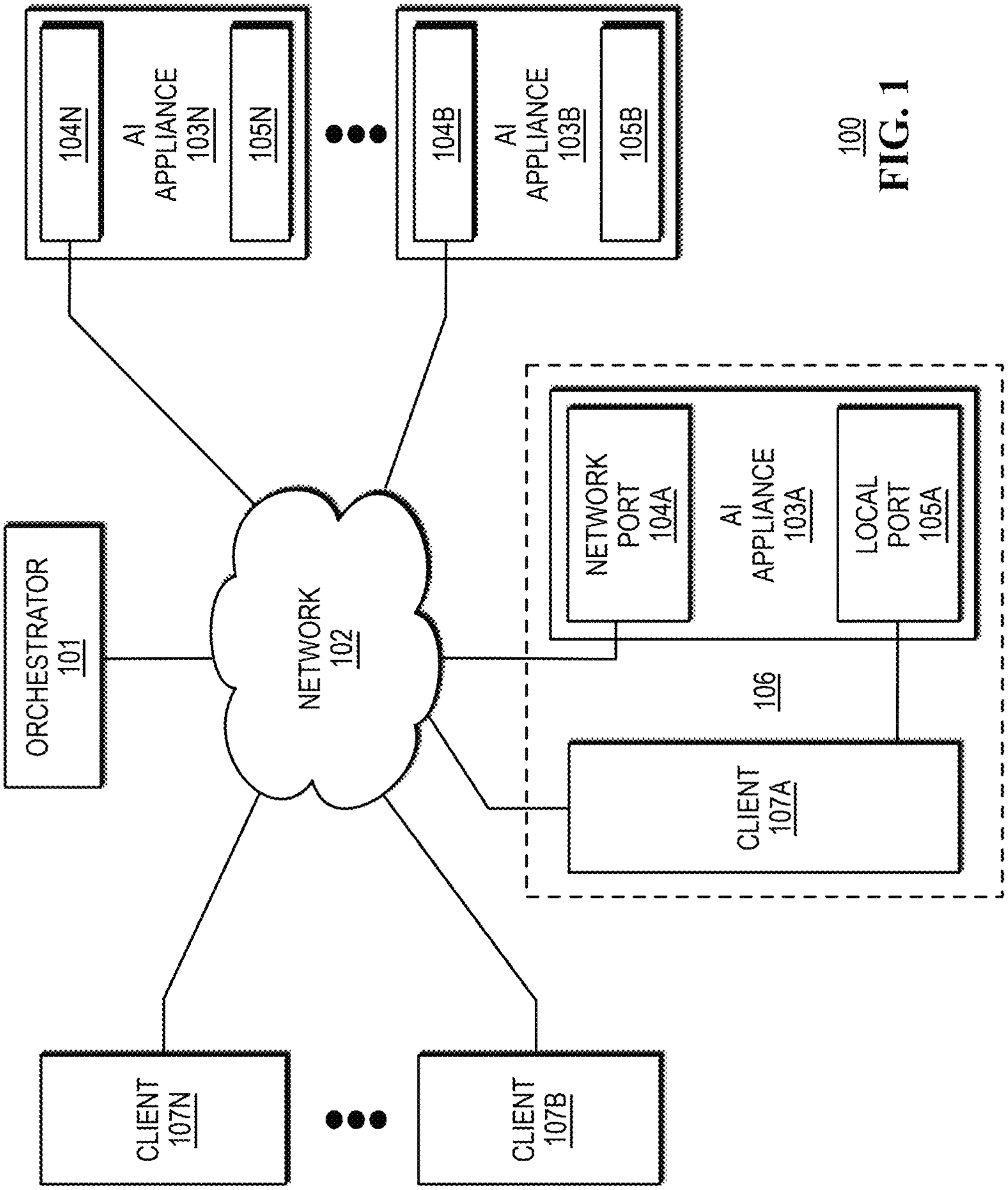
FIG. 1 is a diagram illustrating an example of a system for orchestrating the operation of a plurality of Artificial Intelligence (AI) appliances, according to some embodiments.

The rapid advancement of Artificial Intelligence (AI) technologies has led to an increased demand for efficient and scalable AI processing capabilities. Information Handling Systems (IHSs) are increasingly required to handle complex AI workloads, including tasks such as image recognition, natural language processing, predictive analytics, and more. These tasks often necessitate substantial computational resources, which can be challenging to meet with the limited processing power available in conventional IHSs. As a result, the inventors hereof have identified a growing need for systems that can offload AI processing tasks to specialized AI appliances, thereby enhancing the overall performance and efficiency of IHSs.

Existing solutions for AI processing often involve the use of cloud-based AI services or dedicated AI hardware integrated within the IHS. Cloud-based AI services provide significant computational power but suffer from latency issues and dependency on network connectivity, which can be unreliable or slow. Additionally, the use of cloud services often raises concerns about data privacy and security, as sensitive data may be transmitted over the internet. Dedicated AI hardware integrated within the IHS, such as AI accelerators, can provide low-latency processing but are limited by the physical constraints of the device, including power consumption, heat dissipation, and upgradeability. These concerns hinder the ability of IHSs to scale their AI processing capabilities effectively.

To address these, and other concerns, embodiments described herein provide systems and methods for operating, configuring, orchestrating, and managing a plurality of AI appliances. As shown in more detail below, each AI appliance may provide users with local and/or remote access to their resources. As such, these systems and methods may enable IHSs to offload AI processing tasks to external AI appliances, which can be connected locally or over a network. This approach provides a flexible and scalable solution for enhancing AI processing capabilities.

In various embodiments, each AI appliance may feature a modular architecture, allowing for easy upgrades and integration of new technologies. For example, in each AI appliance, one or more AI accelerators may be added or removed in the field, providing significant flexibility and scalability. Additionally, AI appliances may operate as network-attached devices. These systems and methods also include mechanisms for dynamically configuring AI accelerators based on contextual information, for example, by way of policies or the like. Such context information may include, but is not limited to: presence or proximity of a client to an AI appliance, local and remote resource utilization, network indicators, etc.

In some cases, an AI appliance may be a dock or part of a docking station. These docks can be distributed across an enterprise or workplace, where users may plug into the docking station to access an external monitor, wired networking, and other peripherals. By integrating AI appliances into docking stations, users can seamlessly offload AI processing tasks to the dock's AI accelerators when they connect their IHS to the docking station. This not only adds computational capabilities to the user's IHS but also provides a convenient and efficient way to access additional resources.

Such a docking station may dynamically assign AI accelerators to the connected IHS, ensuring that the most suitable resources are utilized based on the type of connection and the specific AI workload requirements. In various implementations, the integration of AI appliances into docking stations offers a practical and scalable solution for enterprises to enhance their AI processing capabilities while maintaining flexibility and ease of use for their employees.

Notably, the deployment of AI appliances introduces a new paradigm, as some users are remote while others are local with respect to the device. This mixed deployment comes with unique challenges, which these systems and methods also address. For instance, the systems and methods provide mechanisms for discovering and managing AI accelerators across both local and remote connections, ensuring that AI workloads are efficiently distributed and executed.

In various embodiments, an orchestrator may be deployed to perform centralized operations with respect to the AI appliances. Particularly, the orchestrator may serve as a central point for receiving requests from client IHSs or AI appliances to execute AI workloads, load AI models, and perform other AI-related tasks. It may maintain a record of assigned workloads, AI models, and resource allocation to ensure efficient management and execution of AI tasks. The orchestrator may dynamically configure AI accelerators based on the type of connection, ensuring optimal performance and resource utilization. It may also perform load balancing or routing operations to optimize resource utilization and ensure seamless operation. In various embodiments, the orchestrator may maintain a catalog of AI appliances, AI accelerators, network conditions, and the presence of local users. This centralized management capability enables a robust and adaptable AI processing environment that can meet the diverse needs of both local and remote users.

Policies implemented by the orchestrator, AI appliances, or client devices may prioritize local or remote workloads depending on context. For example, when users engage with an AI appliance, especially in docking or high-performance setups, they may expect seamless performance. As such, these policies may prioritize workloads dynamically, ensuring local users receive the necessary resources while accommodating remote demands. The flexibility provided by the modularity of AI appliances, combined with the centralized management capabilities of the orchestrator, enables a robust and adaptable AI processing environment tailored to both local and remote needs.

The term "workload" or "task" as used herein, generally refers to a specific set of tasks or computational processes assignable to an AI appliance for execution. These tasks may encompass a wide range of activities, including analyzing and interpreting visual data, understanding and generating human language, making predictions based on historical data, providing personalized recommendations, converting spoken language into text, creating new content, and processing large datasets to generate human-like text. A workload typically involves the use of an AI model, input data required for the task, configuration settings and hyperparameters that define the model's operation, and the current state of the workload, including its progress, priority, and resource allocation.

To illustrate the foregoing, FIG. 1 is a diagram showing an example of system 100 for orchestrating the operation of a plurality of AI appliances 103-N. In various embodiments, system 100 includes orchestrator 101. Local client IHS 107A and local AI appliance 103A are physically disposed in room, office, or desk 106 ("room 106"), while remote client IHSs 107B-N and remote AI appliances 103B-N are physically disposed outside of room 106. All components are coupled to network 102, and each AI appliance includes a network port 104A-N and a local port 105A.

In operation, orchestrator 101 may serve as a central point for receiving requests from client IHSs 107A-N or AI appliances 103A-N to execute AI workloads, load AI models, and perform other related tasks. It may collect telemetry information from AI appliances 103A-N to build and maintain a catalog of AI appliances 103A-N, AI accelerators, network conditions, the presence, connection status, and/or distance of local users with respect to each AI appliance, etc.

Orchestrator 101 may manage the operation of AI accelerators in each AI appliance and perform load balancing or routing operations to optimize resource utilization, at least in part, based on the catalog and/or context-based policies. In some cases, orchestrator 101 may also provide an Information Technology Decision Maker (ITDM) (e.g., an IT administrator, etc.) access to a console usable for configuring orchestrator 101 and/or AI appliances 103A-N, for example, via settings and/or policies.

Load balancing ensures that computational resources are utilized efficiently, preventing any single AI appliance from becoming a bottleneck while maximizing overall system performance. Orchestrator 101 may achieve this by continuously monitoring the status and performance of each AI appliance, collecting telemetry data such as CPU usage, memory usage, temperature, and workload execution status. Based on this real-time data, orchestrator 101 may make informed decisions about how to allocate and distribute workloads.

Depending upon the output of its load balancing decisions, workload routing or migration information may be sent by orchestrator 101 to one or more AI appliances. This information may include instructions on workload assignment, resource allocation, priority levels, etc. For instance, orchestrator 101 may designate specific AI accelerators within an AI appliance to handle particular tasks, ensuring that each workload has the necessary computational resources to execute efficiently. Additionally, orchestrator 101 may assign priority levels to different workloads, indicating which tasks should be given precedence in terms of resource allocation and execution order. This prioritization may be particularly important when managing high-priority workloads, such as those originating from ITDMs or those related to critical business operations.

Orchestrator 101 may also handle the migration of workloads between AI appliances or AI accelerators as part of its load balancing operations. When an AI appliance becomes overloaded or when a high-priority workload needs to be executed, orchestrator 101 may instruct the AI appliance to migrate lower-priority workloads to other available AI appliances, so that high-priority tasks may receive sufficient computational power and resources to be executed promptly. Additionally, orchestrator 101 may modify network settings to ensure low-latency and high-bandwidth communication between AI appliances and client IHSs, further enhancing the efficiency of workload execution.

In some cases, security and access control may be part of orchestrator 101's routing operations. Orchestrator 101 may implement security measures such as encryption protocols, authentication mechanisms, and access control policies to protect sensitive data and ensure compliance with security standards.

Client IHSs 107A-N connect to the network 102, enabling them to access the AI appliances 103A-N. To that end, AI appliances 103A-N connect to network 102 through their respective network ports 104A-N. As such, each AI appliance 104A-N may be accessed by multiple clients IHSs 107A-N over network 102—in some cases mediated by orchestrator 101—thus allowing for efficient distribution and execution of AI workloads across system 100.

In room 106, local client IHS 107A connects to local AI appliance 103A through local port 105A. Examples of local ports 105A-N include, but are not limited to: USB, Thunderbolt, HDMI, Ethernet, or other wired interfaces commonly used for high-speed data transfer. Additionally, or alternatively, wireless options such as Wi-Fi, Bluetooth, and other short-range communication protocols may be used to establish a local or direct connection between client IHS 107A and AI appliance 103A. Additionally, or alternatively, a network connection may also be direct or local via 105A using IP over Thunderbolt. This may enable a different path for a local connection where communications traverse network 102.

In various implementations, local ports 105A-N may provide high-speed, low-latency connections that enable local client IHS 107A to access AI accelerators within local AI appliance 103A directly. This direct connection may be particularly beneficial for tasks that require real-time AI inferences and high computational performance, ensuring that client IHS 107A offloads AI processing tasks efficiently to local AI appliance 103A.

Additionally, AI appliance 103A may also connect to network 102 via network port 104A. This allows local client IHS 107A to access local AI appliance 103A through network port 104A or over network 102. As such, with respect to client IHS 107A, AI appliance 103A may support both local and remote AI processing.

Figure 2:
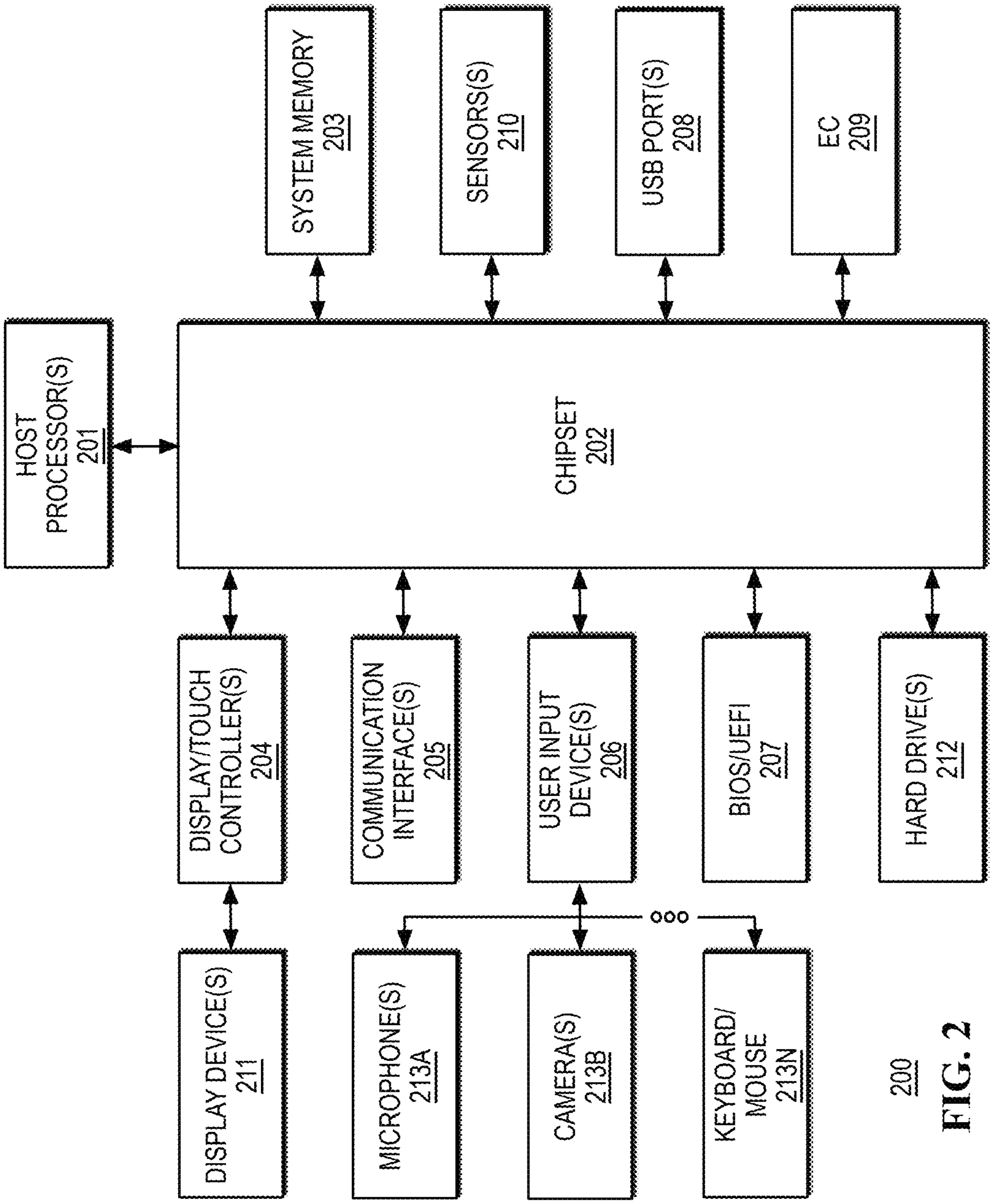
FIG. 2 is a diagram illustrating examples of components of an Information Handling System (IHS), according to some embodiments.

FIG. 2 is a diagram illustrating examples of components of IHS 200. In some implementations, components of IHS 200 may be used to implement orchestrator 101, client IHSs 107A-N, and/or AI appliances 103A-N of FIG. 1. As shown, IHS 200 includes host processor(s) 201.

In various embodiments, IHS 200 may be a single-processor system, a multi-processor system including two or more processors and/or processor cores. Processor(s) 201 may include any processor capable of executing program instructions, such as a PENTIUM processor, or any general-purpose or embedded processor implementing any suitable Instruction Set Architecture (ISA), such as an x86 or Reduced Instruction Set Computer (RISC) ISA (e.g., POWERPC, ARM, SPARC, MIPS, etc.).

IHS 200 utilizes chipset 202 that may include one or more integrated circuits that are connected to processor(s) 201. In the embodiment of FIG. 2, processor(s) 201 are depicted as separate component from chipset 202. In other embodiments, all of chipset 202, or portions of chipset 202 may be implemented directly within the integrated circuitry of processor(s) 201. Chipset 202 provides processor(s) 201 with access to a variety of resources of IHS 200.

In some embodiments, processor(s) 201 may include an integrated memory controller that may be implemented directly within the circuitry of processor(s) 201, or the memory controller may be a separate integrated circuit that is located on the same die as processor(s) 201. The memory controller may be configured to manage the transfer of data to and from system memory 203 of IHS 200 via a high-speed memory interface. System memory 203 provides processor(s) 201 with a high-speed memory that may be used in the execution of computer program instructions by processor(s) 201.

Accordingly, system memory 203 may include memory components, such as static RAM (SRAM), dynamic RAM (DRAM), NAND Flash memory, suitable for supporting high-speed memory operations by processor(s). In certain embodiments, system memory 203 may combine both persistent, non-volatile memory and volatile memory. In certain embodiments, system memory 203 may be comprised of multiple removable memory modules.

As illustrated, a variety of resources may be coupled to processor(s) 201 through chipset 202. For instance, chipset 202 may be coupled to a wireless network controller 205 that may support different types of wireless network connectivity. In certain embodiments, wireless network controller 205 may include one or more Network Interface Controllers (NICs). For example, wireless network controller 205 may implement hardware for communicating via a specific networking technology, such as Wi-Fi, BLUETOOTH, and mobile cellular networks (e.g., CDMA, TDMA, LTE). In some embodiments, network controller 205 may support wireless Wi-Fi communications, and may include a Wi-Fi controller or wireless NIC card by which IHS 200 transmits and receives wireless Wi-Fi signals. Additionally, the wireless signaling utilized by wireless network controller 205 may be implemented using multiple wireless antenna 205*a*.

Chipset 202 also provides processor(s) 201 with access to one or more hard or storage drives 212. In various embodiments, storage drives 212 may be integral to IHS 200 or may be external to IHS 200. In some embodiments, storage drive(s) 212 may be accessed via a storage controller that may be an integrated component of the storage device.

In some embodiments, a storage controller may be a system-on-chip function of processor(s) 201. Storage drive(s) 212 may be implemented using any memory technology allowing IHS 200 to store and retrieve data. For instance, storage drive(s) 212 may be a magnetic hard disk storage drive or a solid-state storage drive. In certain embodiments, storage drive(s) 212 may include a system of storage devices, such as a cloud drive accessible via network interface 205.

As illustrated, IHS 200 also includes BIOS (Basic Input/Output System) 207 that may be stored in a non-volatile memory accessible by chipset 202. In some embodiments, BIOS 207 may be implemented using a dedicated micro-controller coupled to the motherboard of IHS 200. In some embodiments, BIOS 207 may be implemented as operations of embedded controller 209. Upon powering or restarting IHS 200, processor(s) 201 may utilize BIOS 207 instructions to initialize and test hardware components coupled to IHS 200.

BIOS 207 instructions may also load a host Operating System (OS) for use by IHS 200. BIOS 207 provides an abstraction layer that allows the OS to interface with certain hardware components of IHS 200. The Unified Extensible Firmware Interface (UEFI) was designed as a successor to BIOS. As a result, many IHSs utilize UEFI in addition to or instead of a BIOS. As used herein, BIOS is intended to also encompass UEFI.

As described, one or more display devices 211 may be coupled to IHS 200. Display device(s) 211 may include a plurality of pixels that are arranged in a matrix and are configured to display visual information. Display device(s) 211 may include Liquid Crystal Display (LCD), Light Emitting Diode (LED), organic LED (OLED), or other thin film display technologies.

In some embodiments, one or more display device(s) 211 may be capable of receiving touch inputs from a user. In some embodiments, these touch inputs received via display device(s) 211 may be processed by a touch controller that may be separate from other controllers used the display of content. In some embodiments, the touch controller functions may be implemented by a display controller.

Chipset 202 may operate one or more display device(s) 211 via graphics processor and/or Graphics Processor Unit (GPU) 204. In some embodiments, graphics processor 204 may be disposed within a video or graphics card or within an embedded controller installed in IHS 200. For instance, graphics processor 204 may be integrated within processor(s) 201, such as a component of a system-on-chip.

Chipset 202 is coupled to Universal Serial Bus (USB) port(s) 208. Chipset 202 may also provide access to one or more user input devices, in some instances using one or more I/O controller(s) 206 or the like. Examples of user input devices include, but are not limited to microphone(s) 213A, camera(s) 213B keyboard and/or mouse 213N, touch-pad (such as a touchpad integrated in the palm rest area of a laptop IHS), etc.

Some IHSs 200 may utilize an Embedded Controller (EC) 209 or Baseboard Management Controller (BMC) that may be a motherboard component of IHS 200 and may include one or more logic units. In certain embodiments, EC or BMC 209 may operate from a separate power plane from processor(s) 201. Firmware instructions utilized by EC or BMC 209 may be used to operate a secure execution environment that may include operations for providing various core functions of IHS 200, such as power management and management of certain operating modes of IHS 200.

For instance, EC or BMC 209 may implement operations for managing power for IHS 200. In certain instances, EC or BMC 209 may be configured to set and/or enforce input current limits, current sharing ratios, load balancing parameters, etc. with respect to Power Supply Units (PSUs), Battery Management Units (BMUs), etc.

IHS 200 may include a wide variety of sensors 210 for use in gathering telemetry data that can be used in the management of the IHS's operations. Sensors 210 may be disposed on or within the chassis of IHS 200, and may include, but are not limited to: current, voltage, power, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s). Sensors 210 may include geo-location sensors, such as a GPS sensor or other location sensors configured to determine the location of IHS 200 based on triangulation and network information. Various sensors, such as optical, infrared and sonar sensors, may be used in the detection of individuals in proximity to the IHS 200 and their distance from IHS 200, and/or in other forms of user presence detection.

In some embodiments, IHS 200 may not include all components shown in FIG. 2. In other embodiments, IHS 200 may include other components in addition to those shown in FIG. 2. Furthermore, components illustrated as separate components in FIG. 2 may instead be integrated with other components, such that all or a portion of the operations executed by such components may instead be executed by the integrated component.

Figure 3:
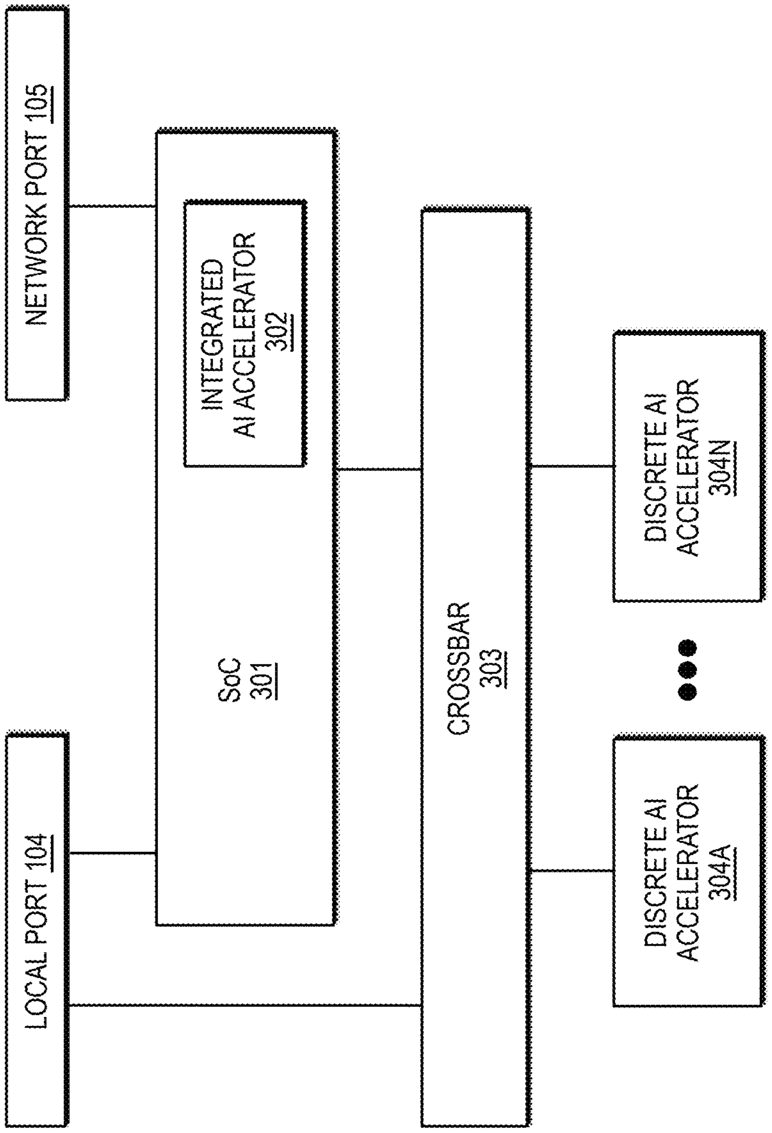
FIG. 3 is a diagram illustrating an example of an AI appliance, according to various embodiments.

FIG. 3 is a diagram illustrating an example of AI appliance 103. In various embodiments, components of AI appliance 103 may include: System-on-Chip (SoC) 301, integrated AI accelerator 302 (e.g., an integrated Neural Processing Unit or "iNPU"), crossbar 303, local port 104, network port 105, and one or more discrete AI accelerators 304A-N.

SoC 301 may serve as the central processing unit of AI appliance 103, managing the overall operations and coordinating the activities of other components. Particularly, SoC 301 is coupled to integrated AI accelerator 302, which provides specialized processing capabilities for AI tasks, enhancing computational efficiency. In some cases, integrated AI accelerator 302 may be configured to handle complex AI computations, offloading these tasks from SoC 301 and thereby improving the overall performance of AI appliance 103. Additionally, integrated AI accelerator 302 may be assignable to client IHSs 107A-N to process their AI workloads.

Crossbar 303 is coupled to SoC 301 and operates as a switch or multiplexer, facilitating communication between SoC 301 and discrete AI accelerators 304A-N, as well as other components or modules. Under the control of SoC 301, crossbar 303 may dynamically configure connections, allowing AI appliance 103 to allocate AI tasks to the appropriate discrete AI accelerator 304A-N based on the current workload and system requirements.

Local port 104 and network port 105 provide connectivity options for AI appliance 103. Local port 104 enables a direct connection to a client IHS, allowing the client to access discrete AI accelerators 304A-N directly. This may be achieved by configuring crossbar 303 to enable an Operating System (OS) of the client IHS to enumerate the discrete AI accelerator as a PCIe device, or another interface. This enumeration process effectively integrates the discrete AI accelerator into the client IHS, making it appear as if the discrete AI accelerator is a native component of the client IHS. This setup allows the client IHS to leverage the full computational power of discrete AI accelerators 304A-N with minimal latency, which is particularly beneficial for tasks that require real-time AI inference and high computational performance. Local port 104 thus provides a high-speed, low-latency connection that enhances the overall performance and efficiency of AI processing tasks performed by the client IHS.

Network port 105 allows AI appliance 103 to connect to network 102, enabling remote clients to access AI accelerators 304A-N the orchestrator 101 to perform telemetry data collection, load balancing, and routing operations.

Discrete AI accelerators 304A-N comprise specialized hardware components designed to perform AI computations efficiently. Particularly, AI accelerators 304A-N may include discrete NPUs, Graphics Processing Units (GPUs), Field-Programmable Gate Arrays (FPGAs), and Application-Specific Integrated Circuits (ASICs), and may be dynamically assigned to different tasks by SoC 301 through crossbar 303. Each discrete AI accelerator 304A-N may have different capabilities and performance characteristics, allowing AI appliance 103 to match the most suitable accelerator to each specific AI workload or model.

In various embodiments, AI appliance 103 may feature a modular design. For example, discrete AI accelerators 304A-N may be replaced, added to, or removed from AI appliance 103 as needed. Additionally, when deployed as a docking station, teleconferencing device, or the like, a modular AI appliance 103 may include other configurable components (e.g., a loudspeaker module, a display panel, etc.).

Figure 4:
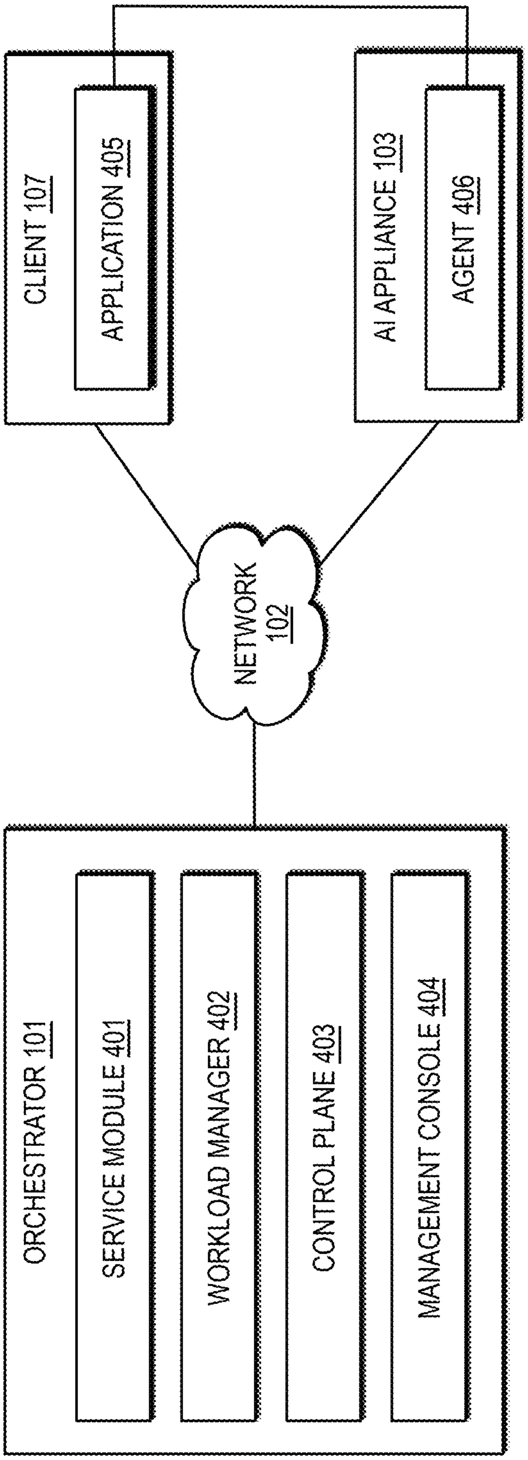
FIG. 4 is a diagram illustrating an example of a component architecture for operating a plurality of AI appliances, according to various embodiments.

FIG. 4 is a diagram illustrating an example of component architecture 400 for operating a plurality of AI appliances. In various embodiments, architecture 400 may be instantiated through the execution of program instructions by orchestrator 101, client 107, and AI appliance 103. Moreover, architecture 400 may be used to illustrate how orchestrator 101 interacts with client IHS 107 and AI appliance 103 over network 102.

Orchestrator 101, through its various components, manages the distribution and execution of AI workloads across multiple AI appliances. To this end, orchestrator 101 includes: service module 401, workload manager 402, control plane 403, and management console 404.

Service module 401 handles the registration and discovery of services within network 102. This module ensures that services provided by AI appliance 103 are registered and can be discovered by client IHS 107 and other network components. In some cases, service module 401 may operate by maintaining a catalog of available services and their respective statuses, enabling efficient service discovery and utilization.

Workload manager 402 may be responsible for scheduling and managing AI workloads. This component allocates tasks to the appropriate AI accelerators within AI appliance 103, ensuring optimal utilization of resources. Workload manager 402 may also monitor the status of ongoing tasks and adjust the allocation of resources as needed. It may dynamically balance AI workloads across multiple AI appliances, thereby enhancing overall performance of architecture 400.

Control plane 403 provides an interface for managing the overall operations of orchestrator 101. This component may handle authentication, security, and policy enforcement, ensuring that only authorized clients and services can access AI appliance 103. Control plane 403 may also coordinate the communication between orchestrator 101 and other network components. It may enforce policies that prioritize local or remote workloads based on the presence or proximity of a local user or client, ensuring that resources are allocated efficiently.

Management console 404 serves as a user interface for ITDMs. It may allow users to configure and manage AI appliances 103, monitor their status, and perform maintenance tasks. Management console 404 may provide a centralized view of the entire AI processing infrastructure, enabling efficient management and troubleshooting. It may include dashboards and reporting tools that give insights into system performance, resource utilization, and potential issues.

Client IHS 107 includes application 405 configured to communicate with AI appliance 103. In some implementations, application 405 may send requests for AI processing tasks to agent 406 of AI appliance 103 via a local port. Additionally, or alternatively, application 405 may send AI workload requests to orchestrator 101 and/or to a remote AI appliance via network 102. Application 405 may be configured to handle various types of AI workloads, such as image recognition, natural language processing, predictive analytics, etc. Application 405 may also communicate with orchestrator 101 to discover available AI appliances and select the most suitable one based on current network conditions and workload requirements.

AI appliance 103 includes agent 406 (e.g., executed by SoC 301) to facilitate communication with orchestrator 101 and client IHS 107. Agent 406 may enable AI appliance 103 to receive and execute AI workloads or tasks from client IHS 107, orchestrator 101, and/or from other client IHSs and AI appliances. Agent 406 may also report the status of AI appliance 103 and other telemetry information to orchestrator 101. As such, agent 406 may manage the AI appliance's local AI accelerators, dynamically configuring them based on the type of connection (local or network) and other contextual conditions, for example, defined by polic(ies).

Having discussed the example systems, architectures, and devices shown in FIGS. 1-4, we now turn our attention to selected operational aspects. In that regard, FIGS. 5-10 depict processes that illustrate, in different scenarios, the operation of systems and methods described herein. In various embodiments, these processes may be performed, at least in part, through the interoperation of components of architecture 400 instantiated by elements of system 100 (e.g., client IHSs 107A-N, AI appliances 103A-N, and orchestrator 101).

Figure 5:
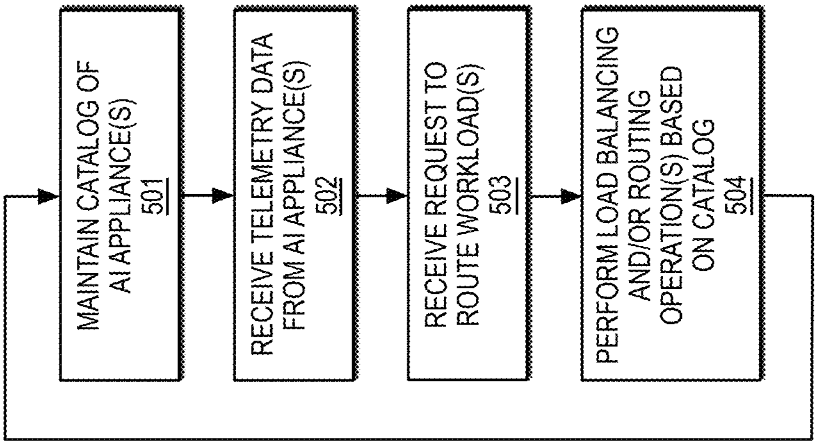
FIG. 5 is a flowchart illustrating an example of a method for maintaining an AI appliance catalog and performing a load balancing operation by the orchestrator, according to various embodiments.

FIG. 5 is a flowchart illustrating an example of method 500 for maintaining an AI appliance catalog, manifest, or database ("catalog") and performing a load balancing or routing operation by orchestrator 101. In various embodiments, at 501, orchestrator 101 creates and/or maintains a catalog of AI appliances, AI accelerators, and other resources, as well as telemetry data (e.g., user presence status, hardware utilization, network connection quality, etc.). The catalog serves as a central repository of information that orchestrator 101 may then use to make informed decisions about workload distribution and resource allocation.

Examples of data stored in the catalog may include but is not limited to, for each AI appliance: unique identifiers (e.g., serial number, MAC address), model and version, manufacturer details, physical and network location, status (e.g., online, offline, maintenance mode), and firmware and software versions. Additionally, the catalog may include information about AI accelerators, such as their type (e.g., NPU, GPU, FPGA, ASIC), model and version, manufacturer details, performance characteristics (e.g., processing power, memory capacity), supported AI models, current utilization and load, temperature and thermal status, and power consumption. Network information may also be included, covering network interfaces and ports (e.g., local port, network port), IP addresses and MAC addresses, network bandwidth and latency, connection status (e.g., connected, disconnected), and/or network topology and routing data.

The catalog may track workload information, detailing current workloads assigned to each AI appliance, such as the execution of AI models, workload priority and scheduling information, resource allocation for each workload, execution status and progress, and historical workload data. Workloads may include, but are not limited to, image recognition models, natural language processing models, predictive analytics models, recommendation systems, speech recognition models, large language models (LLMs), and generative models such as those used for text generation or image synthesis. In some cases, the catalog may maintain a list of installed, loaded, or downloaded AI models available to, or deployed within, each AI accelerator of each AI appliance for assignment of workloads.

Client IHS information may also be kept, including client IHS identifiers (e.g., serial number, MAC address), location, connection type (e.g., local, network), connection status, and resource requirements and constraints. In some cases, the catalog may include or identify one or more policies encompassing load balancing policies, resource allocation policies, security and access control policies, Quality of Service (QoS) policies, and proximity-based prioritization policies. User information may also be cataloged, including user identifiers (e.g., username, user ID), roles and permissions, presence and proximity status, and preferences and settings.

In various implementations, maintenance information may be tracked to ensure the smooth operation of the AI appliances, including scheduled maintenance tasks, maintenance history and logs, firmware and software update schedules, and hardware replacement and upgrade schedules. Environmental information, such as room or office conditions (e.g., temperature, humidity), power supply status and backup information, and physical security status (e.g., access control, surveillance), may also be included. The catalog may also include orchestrator information, detailing its configuration and settings, performance metrics, and error logs and diagnostic information. By maintaining this extensive set of information, orchestrator 101 may make informed decisions about workload distribution, resource allocation, and overall system management, ensuring optimal performance and efficiency of the AI processing infrastructure.

At 502, orchestrator 101 may receive telemetry data from AI appliance(s). This telemetry data may include various performance metrics and operational status information, such as CPU usage, memory usage, disk usage, temperature and thermal status, power consumption, error logs, diagnostic information, historical performance data, workload execution status, and local user presence and/or distance from the AI appliance. In various implementations, current telemetry data may be used to update the catalog.

At 503, orchestrator 101 may receive a request to execute, assign, and/or route a workload, for example, from a client IHS and/or from an AI appliance. The request may specify the AI tasks, workloads, or models to be executed, along with any specific requirements, parameters, or constraints. Orchestrator 101 uses the information in the requests, along with the data in the catalog, to determine the most suitable AI appliance for executing the workload.

Particularly, at 504, orchestrator 101 may perform load balancing and/or routing operations of requests based on the catalog and on the requests themselves. Orchestrator 101 may dynamically allocate workloads to the most appropriate AI appliances, ensuring optimal utilization of resources and balanced distribution of workloads. Orchestrator 101 may consider various factors, such as the current load on each AI appliance, the capabilities of the AI accelerators, and the specific requirements of the workloads, to make routing decisions.

Figure 6:
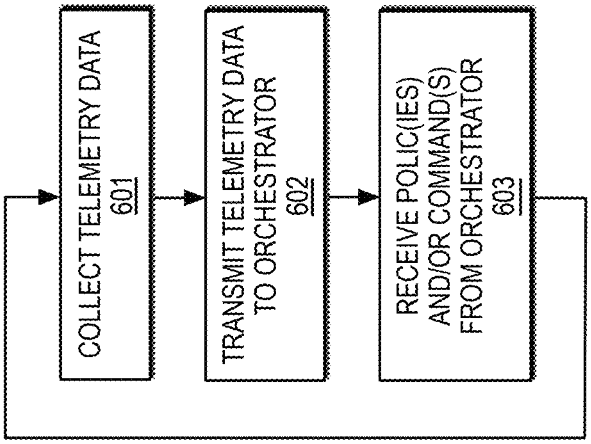
FIG. 6 is a flowchart illustrating an example of a method for collecting telemetry data by an AI appliance, according to various embodiments.

FIG. 6 is a flowchart illustrating an example of method 600 for collecting telemetry data by AI appliance 103. In various embodiments, at 601, AI appliance 103 collects telemetry data related to its operational status and performance, such as CPU usage, memory usage, disk usage, temperature, thermal status, power consumption, and workload execution status. In addition, AI appliance 103 may collect information about the usage or connection status of its local and network ports, and well as data provided by any sensor (e.g., any sensor 210, including a user's proximity, distance, etc. from the AI appliance). The collected telemetry data provides real-time insights into the health and performance of the AI appliance, as well as any of the contextual information described herein, hence enabling proactive monitoring and management.

At 602, AI appliance 103 transmits the collected telemetry data to orchestrator 101. This transmission can occur at regular intervals in response to specific events (e.g., polling) or thresholds. The telemetry data is sent over network 102 to orchestrator 101, where it is used to update the catalog and provide a comprehensive view of the AI appliance's status. Orchestrator 101 may in turn use this telemetry data to make informed decisions about workload distribution, resource allocation, and overall system management.

At 603, AI appliance 103 receives polic(ies) and/or command(s) from orchestrator 101. These policies or commands may include instructions for configuring AI accelerators, adjusting resource allocation, performing maintenance tasks, routing workloads, migrating workloads, loading AI models, or responding to specific events. In some cases, orchestrator 101 may send policies that prioritize certain workloads based on the presence or proximity of a local user, or commands to reconfigure the AI appliance or selected ones of its accelerators.

Figure 7:
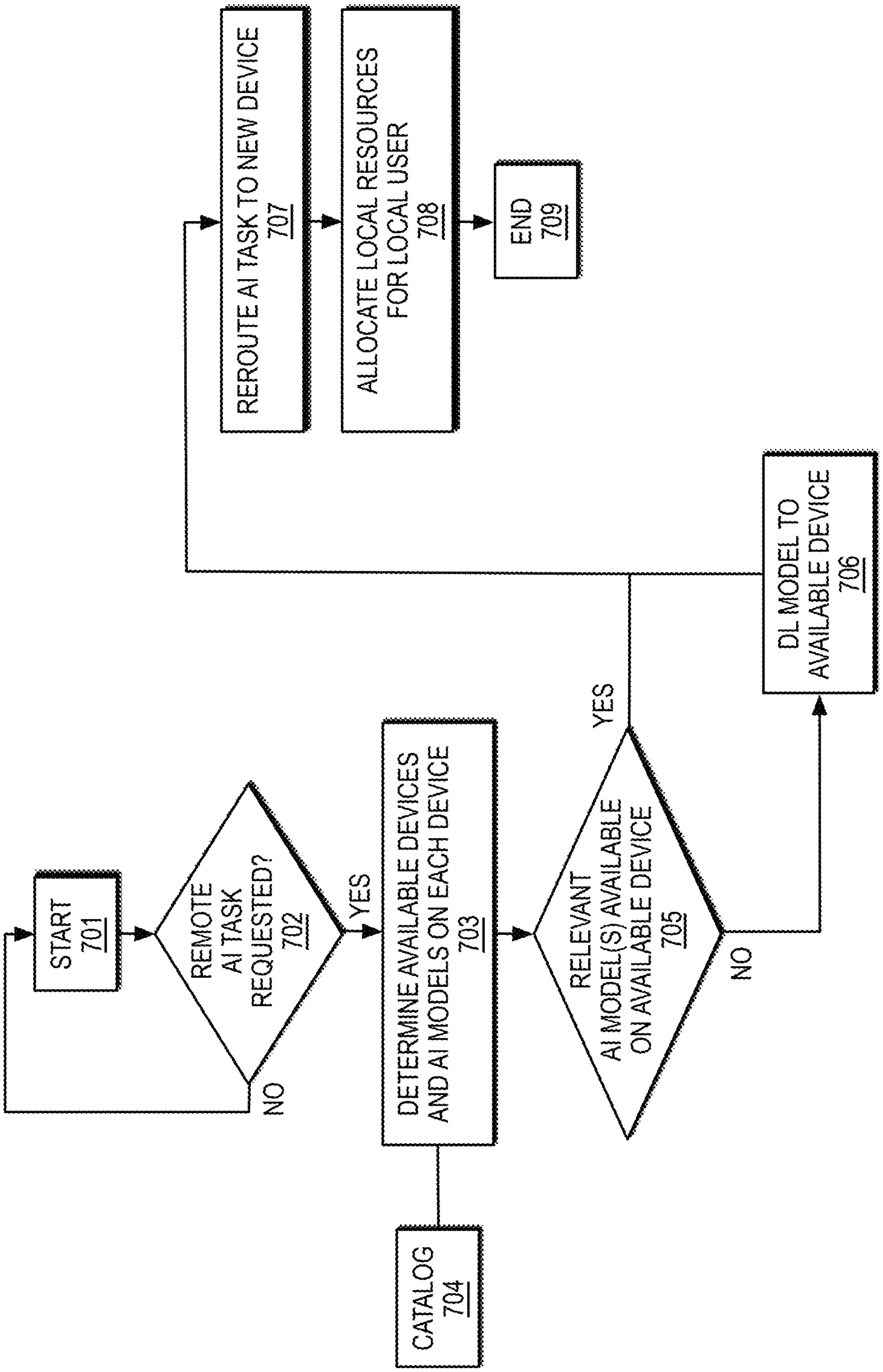
FIG. 7 is a flowchart illustrating an example of a method for routing a task to an AI appliance or accelerator with selected AI model(s), according to various embodiments.

FIG. 7 is a flowchart illustrating an example of method 700 for routing a task to an AI appliance or accelerator with selected AI model(s). In various embodiments, method 700 may be performed, at least in part, by client IHS 107, orchestrator 101, and/or AI accelerator 103.

Method 700 starts at 701. At 702, method 700 includes determining (e.g., by orchestrator 101 and/or AI appliance 103) that a remote AI task has been requested before control is passed to operation 703. At 703, method 700 includes determining available AI appliances and/or accelerators, using catalog 704, as well as AI models available on each device.

At 705, method 700 determines if the relevant AI models are available in a newly selected AI accelerator or appliance. If the relevant AI models are not available, at 706, method 700 may trigger the downloading of such AI models to the selected AI appliance or accelerator. This step ensures that the necessary AI models are pre-loaded and ready for execution, reducing latency and improving responsiveness.

Once the relevant AI models are available, at 707, method 700 includes routing the remote AI task to the newly selected AI appliance or accelerator. This involves directing the task to the most suitable AI appliance or accelerator based on the current workload, resource availability, the specific requirements of the task, as well as the current state of the catalog and/or the application of relevant polic(ies).

At 708, method 700 includes allocating local resources for the local client IHS. This step involves ensuring that the local client IHS has the necessary computational resources to support the execution of the AI task. In addition to allocating integrated and/or discrete AI accelerators to client IHS, orchestrator 101 and/or AI appliance 103 may also allocate memory, processing power, and other resources to the local client IHS to ensure optimal performance. Method 700 ends at 709.

Figure 8:
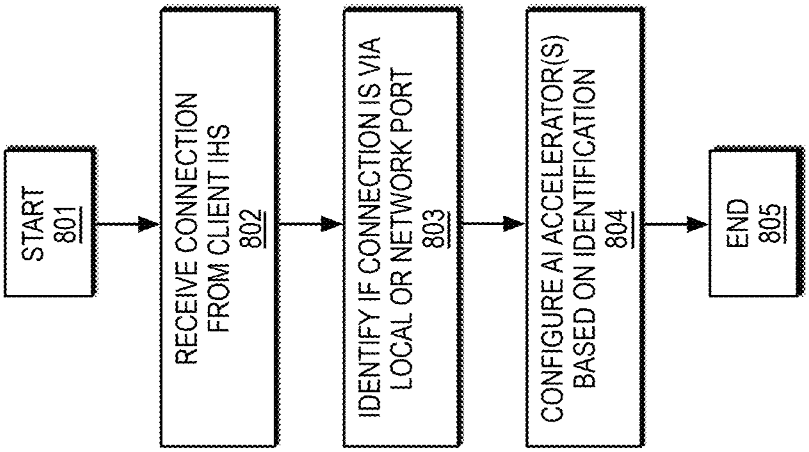
FIG. 8 is a flowchart illustrating an example of a method for configuring an AI accelerator based upon a type of local client IHS connection, according to various embodiments.

FIG. 8 is a flowchart illustrating an example of method 800 for configuring an AI accelerator 303A-N based upon a type of local client IHS connection. In various embodiments, method 800 may be performed, at least in part, by client IHS 107, orchestrator 101, and/or AI accelerator 103.

Method 800 starts at 801. At operation 802, AI appliance 103 receives a connection from a client IHS. In some cases, operation 802 may involve detecting and establishing the connection between the client IHS and AI appliance 103.

At 803, AI appliance 103 identifies whether the client IHS is accessing it via local port 105 (e.g., USB, USB-C, Thunderbolt, HDMI, DisplayPort, Ethernet, Wi-Fi Direct, Bluetooth, P2P connection, etc.—which may be used when the client IHS is in the same room as the AI appliance) and/or network port 104 (e.g., Wi-Fi, Ethernet, etc.—which may be used regardless of whether the AI appliance is local or remote with respect to the client IHS). In various implementations, this port identification operation may determine the presence or proximity of a client IHS to the AI appliance and may be used to influence the configuration of AI accelerators.

At 804, AI appliance 103 may configure one or more AI accelerator(s) 304A-N based on the identification of the client IHS's port in operation 803. For example, if the connection is via a local port, one or more AI accelerators may be configured to provide high-speed, low-latency access to the client IHS, effectively integrating the AI accelerators into the client IHS as if they were native components. In response to the identification (and subject to applicable context-specific rules determined by a policy), the AI appliance may operate a crossbar to allow the client IHS to access the AI accelerator via a PCIe bus, or a similar interface. If the connection is via a network port, the AI accelerators may be configured to handle remote access, optimizing for network latency and bandwidth considerations. Method 800 ends at 805.

Figure 9:
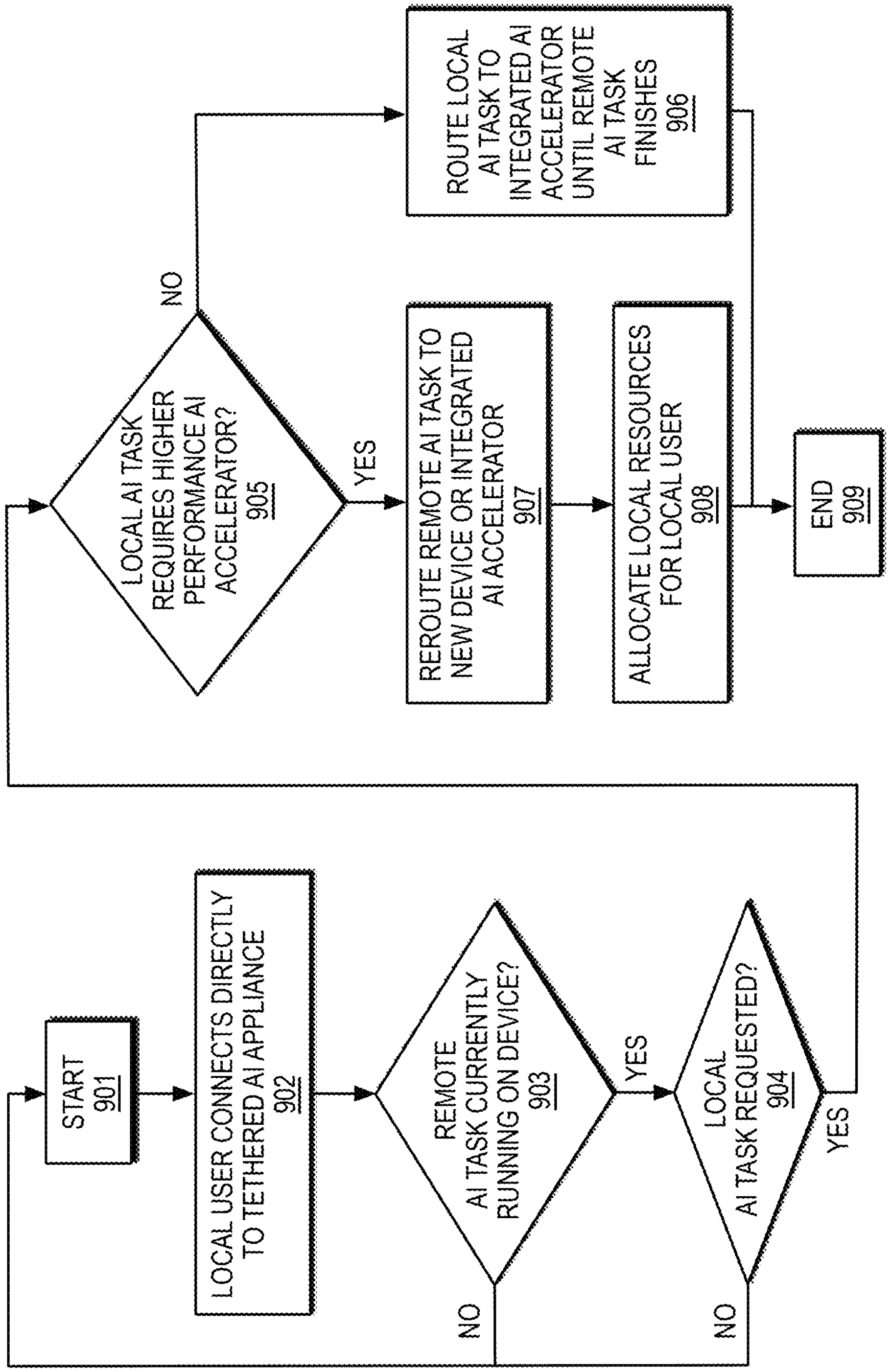
FIG. 9 is a flowchart illustrating an example of a method for offloading AI workloads currently running on a local client IHS to an AI appliance upon connection, according to various embodiments.

FIG. 9 is a flowchart illustrating an example of method 900 for offloading AI workloads currently running on a local client IHS to an AI appliance upon connection. In various embodiments, method 900 may be performed, at least in part, by client IHS 107, orchestrator 101, and/or AI accelerator 103.

Method 900 starts at 901. At 902, client IHS 107A connects directly to AI appliance 103A (e.g., using a wire) in room 106. In some cases, such direct connection may be established through various interfaces such as USB, USB-C, Thunderbolt, HDMI, DisplayPort, or Ethernet, providing a high-speed, low-latency link between the client IHS and the AI appliance.

At 903, method 900 checks if there is any remote AI task or workload currently running on AI appliance 103A. If no remote AI task or workload is detected, control returns to 901, indicating that the AI appliance is available for local tasks. Otherwise, at 904, AI appliance 103A determines whether a local AI task or workload has been requested by client IHS 107A. This may include checking if the client IHS has initiated any AI processing tasks that require the resources of the AI appliance.

If a local AI task or workload has been requested, at 905, AI appliance 103A assesses whether the local AI task or workload requires a higher performance AI accelerator than what the AI appliance can currently offer. This evaluation may consider the computational demands of the task and the capabilities of the available AI accelerators.

If the local AI task or workload does not require higher performance, at 906, AI appliance 103A may route the local AI task or workload to its integrated AI accelerator 302 until the remote task finishes. In some cases, integrated AI accelerator 302 may be configured to provide sufficient computational power for less demanding tasks, allowing the AI appliance to handle both local and remote workloads efficiently.

If higher performance is required, at 907, the AI appliance may reroute or migrate the remote AI task or workload to a new device or integrated AI accelerator 302 to free up the necessary resources for the local client IHS 107A. For example, the AI appliance may transfer the remote task to another AI appliance within the network, so that the high-performance AI accelerator may be available for the local task. Alternatively, the AI appliance may move the remote task from the high-performance, discrete AI accelerator to a different AI accelerator within the same AI appliance to maintain the continuity of the remote task execution. Once resources are allocated for the local user at 908, the AI appliance may proceed with executing the local AI task or workload for the client IHS 107A. Method 900 ends at 909.

Figure 10:
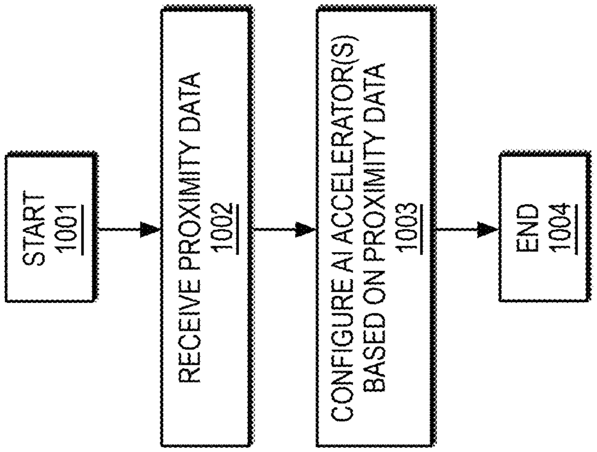
FIG. 10 is a flowchart illustrating an example of a method for configuring an AI accelerator based upon client IHS proximity information, according to various embodiments.

FIG. 10 is a flowchart illustrating an example of method 1000 for configuring AI accelerator 103 based upon client IHS proximity information. In various embodiments, method 1000 may be performed, at least in part, by client IHS 107, orchestrator 101, and/or AI accelerator 103.

Method 1000 starts at 1001. At 1002, AI appliance 103 receives or collects proximity and/or distance data reflective of the presence, proximity, and/or physical distance between the client IHS and AI appliance 103. This data may be collected using various sensors, such as infrared, ultrasonic, radar, or other proximity sensors, which detect the presence and distance of the client IHS relative to the AI appliance. In some cases, the presence, proximity, and/or physical distance may be collected directly by AI appliance 103 using its own sensors. Additionally, or alternatively, other presence, proximity, and/or physical distance between the client IHS and its user may be provided by the client IHS to AI appliance 103.

At 1003, if the client IHS is detected to be in proximity to AI appliance 103, AI appliance 103 may configure one or more AI accelerators accordingly. In some cases, one or more operations may be triggered at different distances. For instance, at a first distance between the client IHS and the AI appliance, the AI appliance may perform a first AI accelerator configuration or AI workload operation and, at a second distance is detected, may perform a subsequent accelerator configuration or AI workload operation. As such, AI accelerator 103 may take proactive measures to improve performance and resource utilization once the client IHS connects via a local port. Method 1000 ends at 1004.

In some cases, AI appliance 103 may initiate the downloading or loading of AI models to one or more selected AI accelerators. This ensures that the required models are downloaded, pre-loaded onto a local memory, and/or ready for use, reducing latency and improving the responsiveness of the system. Additionally, or alternatively, AI appliance 103 may configure its crossbar switch to establish the appropriate data paths between the client IHS and the AI accelerators. This allows the client IHS to access the AI accelerators via a high-speed interface, such as PCIe, effectively integrating the AI accelerators into the client IHS as if they were native components, upon physical connection to the AI accelerator (e.g., via a thunderbolt cable, or the like).

Additionally, or alternatively, AI appliance 103 may migrate existing workloads (e.g., being executed on behalf of remote client IHSs) away from one or more selected AI accelerators to be designated for the client IHS. This proactive or preemptive migration makes AI accelerators available and dedicated to the client IHS, providing the necessary computational resources for high-performance AI processing tasks.

AI appliance 103 may also allocate additional memory and processing resources to selected AI accelerators in anticipation of high-demand tasks. This provides AI accelerators with sufficient resources to handle complex AI workloads efficiently. Additionally, or alternatively, if the client IHS is detected to be within a certain range, AI appliance 103 may modify wireless settings to prioritize traffic between the client IHS and the AI appliance. This can include adjusting Quality of Service (QoS) settings to ensure low-latency and high-bandwidth communication over a wireless local port.

Additionally, or alternatively, AI appliance 103 may pre-configure security settings to establish secure communication between the client IHS and the AI appliance. This may include setting up encryption protocols, authentication mechanisms, and access control policies to protect sensitive data and ensure compliance with security standards. Additionally, or alternatively, AI appliance 103 may adjust its own power settings and/or of its accelerators to optimize energy consumption based on the proximity of the client IHS. For example, if the client IHS is detected to be close, the AI appliance may switch to a high-performance mode, whereas if the client IHS is far, it may operate in a more energy-efficient mode.

In other cases, AI appliance 103 may apply user-specific configurations based on the identity of the client IHS or of a user of the client IHS. This may include loading user-specific AI models, applying personalized settings, and prioritizing workloads based on the user's preferences and requirements. Additionally, or alternatively, AI appliance 103 may perform predictive maintenance tasks to ensure that the AI accelerators are in optimal condition. This may include running diagnostics, checking for hardware issues, and performing any necessary maintenance tasks to prevent potential failures.

Additionally, or alternatively, AI appliance 103 may check licensing or entitlement information in anticipation of the local connection. This ensures that the client IHS has the necessary permissions to access certain AI accelerators and/or AI models. By verifying entitlements beforehand, AI accelerator 103 may also prevent unauthorized access and ensure compliance with licensing agreements.

In some cases, AI appliance 103 may communicate with the client IHS to discover the AI workloads that the client is executing prior to the connection. This allows the AI appliance to start preparing the migration of these workloads in anticipation of the local enumeration. By understanding the client's current workloads, the AI appliance may pre-load the necessary models, allocate resources, and configure its AI accelerators to facilitate a seamless transition.

Moreover, by layering these various configuration operations based on the presence, proximity, and/or distance of the client IHS, AI appliance 103 may autonomously prepare itself to provide optimal performance and resource utilization as soon as the client IHS connects to its local port. In some cases, these proactive behaviors may be prescribed by a policy's rules based on any of the context information described herein, to improve the overall efficiency and effectiveness of AI processing tasks and meet the demands of local and remote users.

Figure 11:
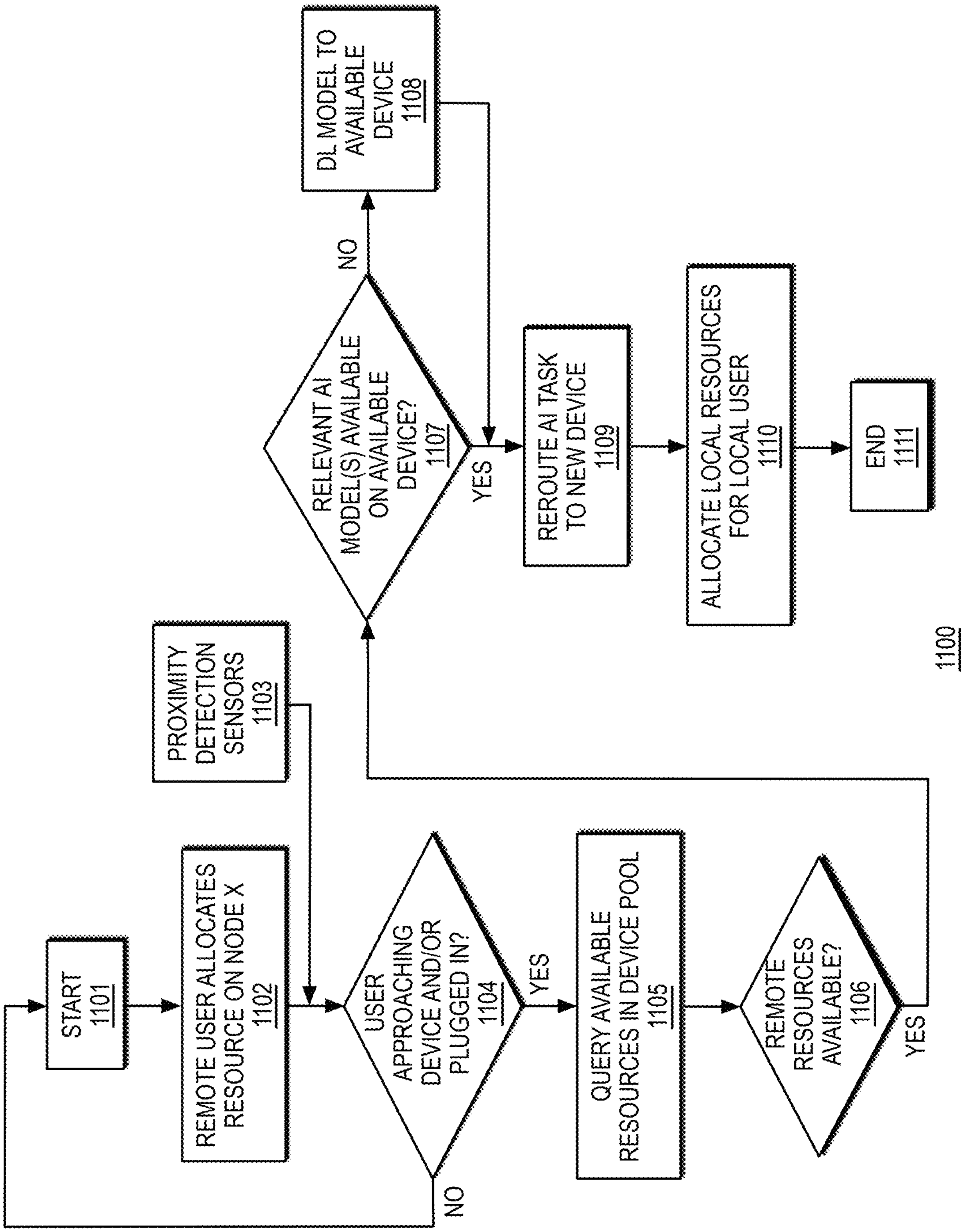
FIG. 11 is a flowchart illustrating an example of a method for enabling or disabling an AI appliance or feature based upon client IHS or user presence or proximity, according to various embodiments.

FIG. 11 is a flowchart illustrating an example of method 1100 for enabling or disabling an AI appliance or feature based upon client IHS or user presence or proximity. In various embodiments, method 1100 may be performed, at least in part, by client IHS 107, orchestrator 101, and/or AI accelerator 103.

Method 1100 starts at 1101. At 1102, a remote client IHS allocates an AI accelerator in a selected or assigned AI appliance. This allocation may involve the remote client IHS requesting access to the AI accelerator to execute a specific workload. The AI appliance may be selected or assigned based on the availability and suitability of its resources to handle the requested workload.

Based on presence, proximity, or distance data received from sensors at 1103, the selected or assigned AI appliance may, at 1104, determine whether a local user is approaching it or plugged into it via its local port. This data may be collected using various sensors, such as infrared, ultrasonic, radar, or other proximity sensors, which detect the presence and distance of the local user relative to the AI appliance. If no local user is detected, control returns to 1101, indicating that the AI appliance can continue executing the remote workload without interruption.

If a local user is detected, at 1105, the selected or assigned AI appliance may use a copy of the catalog and/or consult the orchestrator to determine the available remote resources. The catalog contains detailed information about each AI appliance, including their capabilities, status, and available resources. The orchestrator may provide additional coordination for efficient resource allocation.

At 1106, the selected or assigned AI appliance and/or the orchestrator may determine whether the relevant AI models to execute the workload are available on an alternative remote AI appliance. This may include checking the catalog to see if another AI appliance has the necessary AI models pre-loaded and ready for execution. If, at 1107, the relevant AI models are determined to not be available, at 1108, method 1100 may trigger the downloading of the AI models onto the alternative remote AI appliance, so that is prepared to take over the execution of the remote workload.

At 1109, the selected or assigned AI appliance may reroute or migrate the remote AI task to the alternative remote AI appliance. This migration may include transferring the execution of the remote workload from the current AI appliance to the alternative one, so that the task continues to be processed without interruption. The orchestrator may coordinate this migration to maintain the continuity and efficiency of the workload execution.

At 1110, the selected or assigned AI appliance may allocate its AI accelerator (previously executing the remote load) to the local client IHS. Such an allocation may involve, for example, reconfiguring the AI accelerator and/or crossbar to provide high-speed, low-latency access to the local client IHS, effectively integrating the AI accelerator into the client IHS as if it were a native component. At 1111, method 1100 ends.

Figure 12:
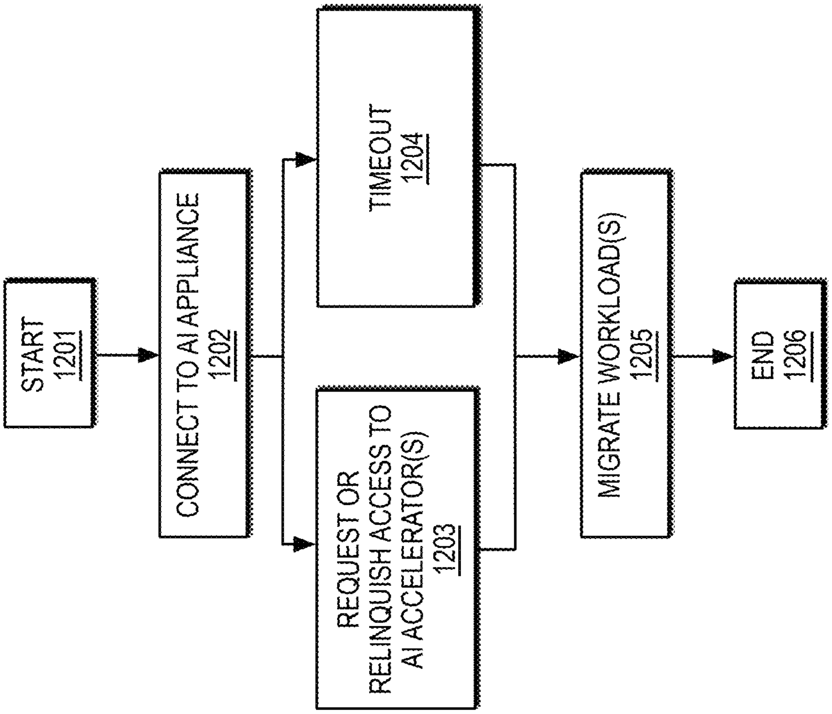
FIG. 12 is a flowchart illustrating an example of a method for requesting and relinquishing access to an AI accelerator, according to various embodiments.

FIG. 12 is a flowchart illustrating an example of method 1200 for requesting and relinquishing access to AI accelerator 103. In various embodiments, method 1200 may be performed, at least in part, by client IHS 107, orchestrator 101, and/or AI accelerator 103.

Method 1200 begins at 1201. At 1202, client IHS 107 connects to an AI appliance. In some cases, this connection may follow one or more proactive configuration operations performed by the AI appliance and triggered based on the physical presence, proximity, or distance of the client IHS. These proactive configurations may include pre-loading AI models, configuring the crossbar switch, migrating existing workloads, and other preparatory steps to ensure optimal performance.

At 1203, client IHS 107 may request or relinquish access to one or more AI accelerators of the AI appliance. This may involve client IHS's application communicating its need for AI processing resources to the AI appliance's agent over a local port. The AI appliance may evaluate the request and determine the appropriate action based on current resource availability and/or policies. Additionally, or alternatively, the AI appliance may send an indication of the client IHS's request to orchestrator 101 and receive one or more instructions or commands based on the orchestrator's load balancing or routing operations using the catalog. Alternatively, rather than sending the request directly to an AI appliance, the client IHS 100 may send the request to orchestrator 101, which in some cases may modify the request prior to forwarding it to an appropriate AI accelerator.

At 1204, in the absence of a request for access or relinquishing access being sent by the client IHS, the orchestrator and/or the AI appliance may detect a timeout if the client IHS does not respond within a specified timeframe. This timeout mechanism ensures that AI accelerators are not left idle or underutilized, for example, due to inactive connections.

At 1205, in response to either a request or relinquishment of access, or a detected timeout, the AI appliance migrates one or more workloads to or from an AI accelerator. For example, if the client IHS requests access to an AI accelerator, the AI appliance may migrate workloads from the local client IHS to the AI appliance via the local port, ensuring that the AI accelerator is dedicated to the client IHS.

Additionally, or alternatively, if a current workload under execution is being executed by the AI accelerator selected to be assigned to the local client IHS, the AI appliance may migrate the current workload to another AI appliance, so that the AI accelerator is available for the local client IHS while maintaining the continuity of the workload execution.

Additionally, or alternatively, if a remote client IHS's workload is being executed by a first AI accelerator selected to be reassigned, the AI appliance may migrate the workload to a second AI accelerator within the same AI appliance. In some cases, the second AI accelerator may be an iNPU or discrete NPU, to avoid interruptions in execution. Method 1200 ends at 1206.

Figure 13:
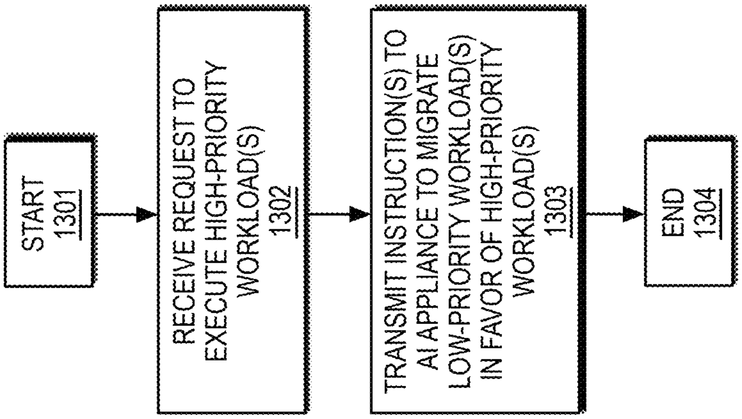
FIG. 13 is a flowchart illustrating an example of a method for managing local client IHS workloads in response to receiving remote workloads having higher priorities, according to various embodiments.

FIG. 13 is a flowchart illustrating an example of method 1300 for managing local client IHS workloads in response to receiving remote workloads having higher priorities. In various embodiments, method 1300 may be performed, at least in part, by client IHS 107, orchestrator 101, and/or AI accelerator 103.

Method 1300 starts at 1301. At 1302, the orchestrator and/or an AI appliance may receive a request to execute one or more high-priority workloads. The determination of priority can be based on various factors, such as, for example: (a) requests originating from an ITDM may be automatically considered high-priority due to their critical nature and the authority of the requester; (b) method 1300 may use context-based rules to determine the importance of a workload. For example, workloads related to emergency situations, critical business operations, or time-sensitive tasks may be given higher priority. Additionally, or alternatively, users may specify the priority of their workloads, which method 1300 may consider when making resource allocation decisions.

In some cases, priority determinations may be governed by policies implemented by the orchestrator, AI appliances, or client devices. Any of the contextual information described herein, such as the presence or proximity of a local user, network conditions, or the specific requirements of the workload, may be part of the context-based rules used to determine priority.

At 1303, upon determining the high-priority status of the received workload, the orchestrator or AI appliance may transmit instructions to another AI appliance to migrate lower-priority workloads to ensure that the AI accelerators are available to execute the high-priority workloads. In some cases, the orchestrator and/or AI appliance may move lower-priority workloads to other available AI accelerators within the same appliance or to other AI appliances in the network. If immediate migration is not feasible, the orchestrator and/or AI appliance may temporarily pause or suspend lower-priority workloads to free up resources for the high-priority tasks. Additionally, or alternatively, the orchestrator and/or AI appliance may consider the proximity of the client IHS to the AI appliance when reallocating resources. For example, if a local client IHS is executing a low-priority workload, the system may prioritize the high-priority workload from a remote client IHS by reallocating resources accordingly. Method 1300 ends at 1304.

As such, systems and methods as described herein may provide AI appliances designed for efficient workload management and interaction with client IHSs. Each AI appliance may include an SoC, one or more discrete AI accelerators coupled to the SoC, and a memory that stores program instructions. These components may enable the AI appliance to perform operations including detecting client IHSs, configuring resources, and managing AI workloads. The SoC may execute program instructions that allow the AI appliance to detect and communicate with client IHSs, adjust configurations of the AI accelerator based on connection types (local port or network port), and route workloads received from client IHSs. Furthermore, the AI appliance may operate as part of a docking station and support other types of interactions (e.g., external display, network access, storage systems, etc.).

The ability to differentiate operations depending on whether the client IHS is connected via a local or network port is important in many scenarios. For example, when a local client connection is detected, the AI appliance may enable configuration adjustments such as assigning the AI accelerator exclusively to the local client IHS, granting priority access to resources, and preparing workloads with minimal latency. In contrast, when a client IHS connects via a network port, the appliance may migrate workloads to other AI accelerators within the network, select AI models optimized for remote access, or allocate resources based on network policies. These configurations enhance the efficiency and flexibility of the appliance, ensuring it meets the diverse requirements of both local and remote clients.

An AI appliance may manage workloads by receiving and processing various tasks, including large language models, computer vision applications, generative AI tasks, reinforcement learning, and multimodal processing. The AI appliance may support concurrent execution of workloads, including workload queuing and prioritization, and optimizes workload processing by migrating lower-priority workloads or pre-loading models. Sensors such as infrared, ultrasonic, and radar or user inputs are employed to detect the proximity of locally disposed client IHSs and/or their users. Based on proximity or distance, an AI appliance may prepare a selected, requested, or assigned AI accelerator for use, which may include migrating workloads or pre-loading AI models. The AI appliance may adhere to policies set by ITDMs or orchestrators to govern workload execution and resource allocation.

Moreover, an AI appliance may interact with a remote orchestrator that maintains a catalog that details connected AI appliances and accelerators, including identification numbers, utilization metrics, network metrics, and loaded AI models. This catalog may be used by the orchestrator and/or AI appliance to route workloads to suitable appliances or accelerators based on contextual information and to balance workloads across multiple accelerators, optimizing efficiency. The AI appliance may report telemetry data to the orchestrator, including workload execution status, AI model availability, and user or client IHS presence.

An AI appliance may detect client IHS connections and enabling appropriate access modes, reallocating resources upon disconnection or based on client requests, triggering workload migrations or configuration changes based on proximity, and identifying and executing high-priority workloads while migrating lower-priority workloads to other accelerators or appliances. Conversely, client IHSs may be configured to establish connections with AI appliances, request access to AI accelerators (local, network, or proxy), receive catalog data from orchestrators, and send workload requests to selected AI appliances based on catalog information.

In some cases, an AI appliance may enable enumeration of AI accelerators for client IHSs upon connection, disable enumeration based on workload priorities or client requests, and notify the orchestrator about AI accelerator status changes. The orchestrator may maintain telemetry data for connected AI appliances and accelerators, balancing workloads across accelerators based on availability and connection status, and sending configuration or migration instructions to AI appliances to optimize resource utilization.

Having discussed certain operations performed by the systems, architectures, and devices depicted in FIGS. 1-4 in connection with FIGS. 5-13, we now turn our attention to example implementations thereof.

Consider a scenario where a user connects their client IHS to an AI appliance via a local port to perform computationally intensive real-time AI tasks, such as running a generative design application for 3D modeling. The AI appliance may detect the local connection and assign the AI accelerator exclusively to the client IHS, ensuring low-latency processing. Policies set by ITDMs may dictate that local real-time users have priority access over networked users, for uninterrupted performance. Context-based rules within the appliance may allow it to throttle lower-priority background tasks temporarily to dedicate resources fully to the local user.

Consider another implementation where a data scientist is working remotely sends a workload to the AI appliance over a network. The AI appliance may receive the workload and consult policy rules provided by the orchestrator to determine that it is more efficient to execute the task on a different AI appliance within the network. The workload may then be migrated accordingly, with the network-coupled resources optimized for remote execution. This scenario demonstrates the AI appliance's ability to balance workloads dynamically while maintaining desired processing speed and accuracy.

Consider yet another implementation in a shared office setting where an AI appliance detects multiple client IHSs within its proximity using integrated sensors. A local client may begin a high-priority workload involving a large language model, triggering context-based rules that allocate the AI accelerator exclusively to the local user. Concurrently, other workloads from remote clients may be migrated to network-connected AI appliances to ensure optimal performance. Policies enforced by ITDMs may provide that users within proximity have precedence for accelerator resources while maintaining system-wide efficiency.

Consider a scenario where a university utilizes distributed AI appliances to support hybrid classroom environments. Local students may use the appliance for low-latency tasks like interactive simulations, while remote students access the same appliance for assignments requiring less immediate feedback. Context-aware policies may prioritize local real-time use, throttling non-critical remote workloads when necessary. The AI appliances may dynamically allocate resources to balance educational demands effectively.

Consider another implementation where an AI appliance in a command center prioritizes processing critical workloads such as real-time predictive modeling of weather patterns. Lower-priority workloads, such as routine data analysis, may be migrated to remote appliances within the network to free up resources. Policies implemented by ITDMs may ensure that emergency tasks are completed without interruption, while telemetry data from the appliance informs orchestrators of ongoing resource availability.

Consider yet another implementation where, in a corporate setting, a high-priority client IHS initiates a last-minute workload requiring significant computational power. The AI appliance may reallocate its resources by suspending non-critical tasks and migrating ongoing workloads to other appliances. ITDM-defined policies and context-aware rules may increase the probability that high-priority workloads are completed on time. Additionally, the AI appliance's telemetry data may provide real-time updates to orchestrators, enabling efficient resource coordination across the network.

Having discussed the example architectures, devices, operational aspects, and implementations shown in FIGS. 1-13, we now turn our attention to other aspects of the systems and methods described herein. In various embodiments, each AI appliance may feature a modular architecture, allowing for upgrades and integration of new technologies, as well as for distribution or AI resources. For example, in a modular AI appliance, one or more discrete AI accelerators may be added or removed in the field, providing significant flexibility and scalability. Additionally, AI appliances may operate as network-attached devices.

In some embodiments, a base module may include SoC 103 with one or more integrated AI accelerators 302 and/or one or more discrete accelerators 304A-N coupled to the SoC. The base module may be responsible for managing the overall operations of the AI appliance, coordinating the activities of other components, and providing essential computational capabilities. It may also include various connectivity options, such as local ports (e.g., USB, Thunderbolt, HDMI, Ethernet) and network ports, enabling both local and remote access to the AI appliance's resources.

In various implementations, the base module may operate as, or be part of, a docking station, or the like. As such, the base module may provide local client IHSs with access not only to AI operations but also external displays, wired connectivity, etc. By integrating AI appliances into docking stations, users can offload AI processing tasks to the dock's AI accelerators when they connect their IHS to the docking station.

In addition to the base module, a floor module may be an expansion module which may be vertically coupled to the base module (e.g., below the base module) to enhance the AI appliance's performance and capabilities. In various embodiments, such a floor module may include additional discrete AI accelerators (e.g., 304A-N), memory modules, and other specialized hardware components.

A top module may also be vertically coupled to the base module (e.g., above the base module). In some embodiments, a base module may include a teleconferencing module, which may have controller (e.g., an SoC, an audio controller, etc.), a conference speaker and/or microphone, and/or wireless connectivity features.

The top module may extend the base module further, and it may be configured to facilitate seamless communication and collaboration, making the AI appliance suitable for remote conferencing and other interactive applications. In other embodiments, however, the top module may include: display(s), touch screen(s), button(s) or switch(es), I/O ports or connectors, storage modules, sensors, lighting components, fans, heatsinks etc. In some cases, the top module may be coupled to the base module via a spring-loaded pin or pogo connector (e.g., USB, etc.).

In some cases, the top module may be configured as a display module with an LCD, LED, or OLED screen for real-time monitoring and data visualization. It may also function as a touch interface module, providing intuitive user interaction through touch gestures. Additionally, the top module may house various sensors, such as cameras and environmental sensors, for applications like video conferencing and security. It may include high-quality speakers for enhanced audio output, additional communication interfaces like Wi-Fi and Bluetooth, and extra storage components to expand data capacity. The top module may also feature a battery pack for portable power, advanced cooling solutions for better thermal management, LED lighting for illumination, and expansion slots for peripheral devices. This range of configurable options allows the top module to be tailored to meet specific applications, providing flexibility and scalability.

As such, the base module provides the core processing capabilities and connectivity options, the floor module allows for the expansion and upgrading of the AI appliance's performance and capabilities, and the top module facilitates specific operations such as, for example, teleconferencing. In various other embodiments, any number of modules may be vertically stacked to create a highly modular and adaptable AI appliance. Such a modular design may support the integration of new technologies and ensure ease of maintenance and the recycling and reuse of components.

Figure 14:
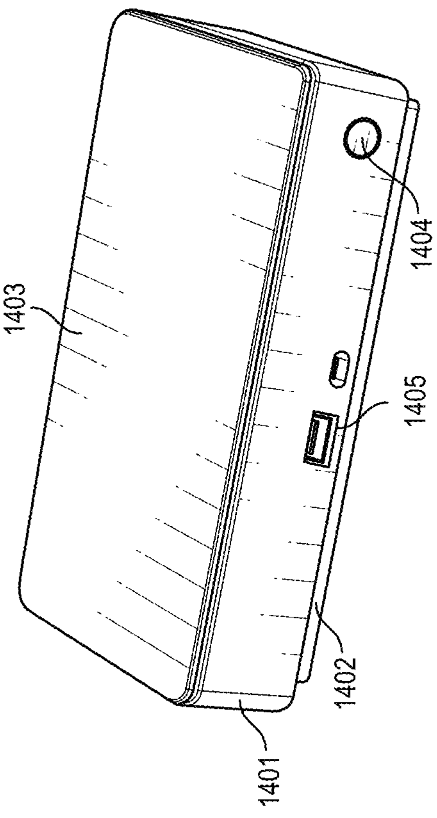
FIG. 14 is a diagram illustrating a front view of an example of a base module, according to various embodiments.

FIG. 14 is a diagram illustrating a front view of an example of a base module 1400 of AI appliance 103. In various implementations, base module 1400 may include one or more components shown in FIG. 3. Particularly, base module 1400 is housed within chassis 1401, which provides structural support and protection for the internal components. Chassis 1401 includes recessed portion 1402, which may be used to accommodate additional modules or components (e.g., a floor module).

Cover 1403 is provided to protect the internal components and may be removable to allow for easy access and maintenance. Base module 1400 may also include power button 1404 for powering the AI appliance on and off, as well as various connectors 1405 (e.g., USB, Thunderbolt, HDMI, Ethernet) for interfacing with other devices and networks. In some cases, connectors 1405 may provide a local client IHS with access to local and/or network ports 104 and 105.

Figure 15:
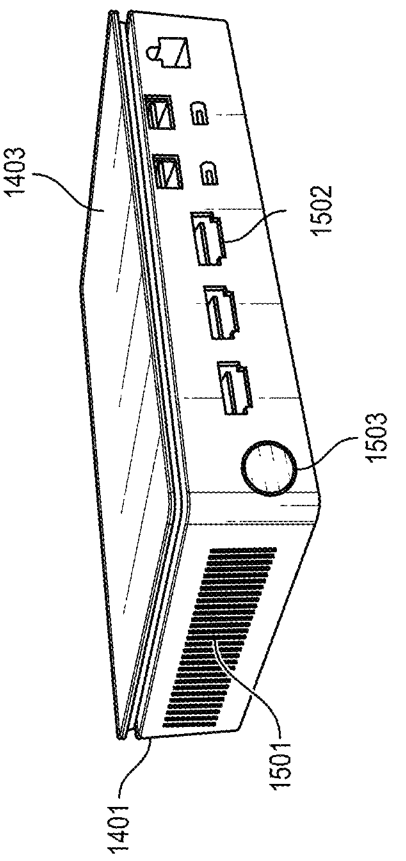
FIG. 15 is a diagram illustrating a rear view of an example of a base module, according to various embodiments.

FIG. 15 is a diagram illustrating a rear view 1500 of base module 1400. As shown, chassis 1401 includes cover 1403. Rear view 1500 depicts lateral ventilation area(s) 1501 for promoting heat dissipation and maintaining optimal operating temperatures for internal components. It also shows power connector 1503 to power base module 1401 using a power supply or AC mains, for example, via a cable or wire. Additionally, rear view 1500 includes various connectors 1502, such as USB, Thunderbolt, HDMI, and Ethernet ports. Connectors 1502 enable the AI appliance to interface with other devices (e.g., external displays) and networks, facilitating both local and remote access to the AI appliance's resources and/or docking station operations.

Figure 17:
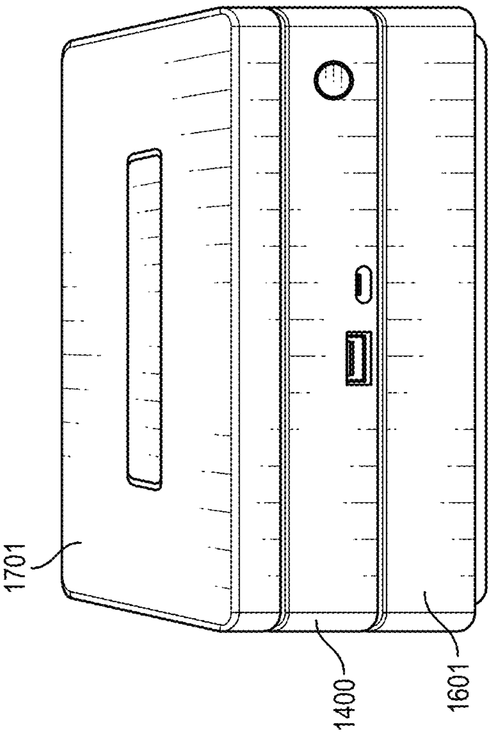
FIG. 17 is a diagram illustrating a front view of an example of an AI appliance including a base module, a floor module, and a top module according to various embodiments.
Figure 16:
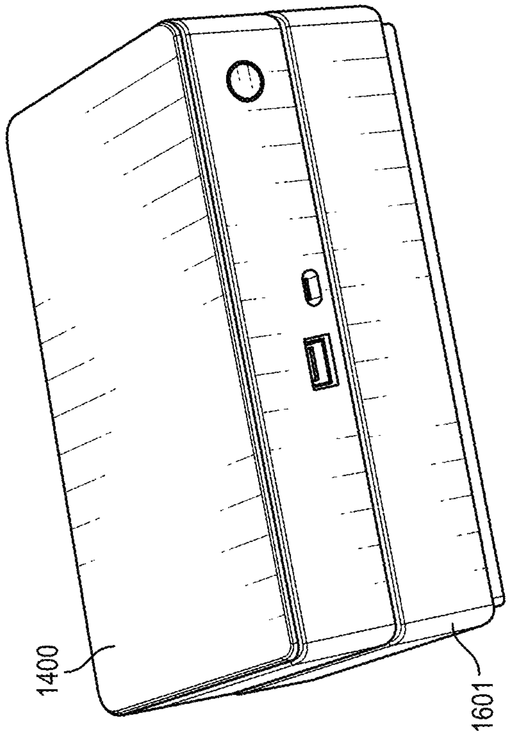
FIG. 16 is a diagram illustrating a front view of an example of an AI appliance including a base module and a floor module, according to various embodiments.
Figure 18:
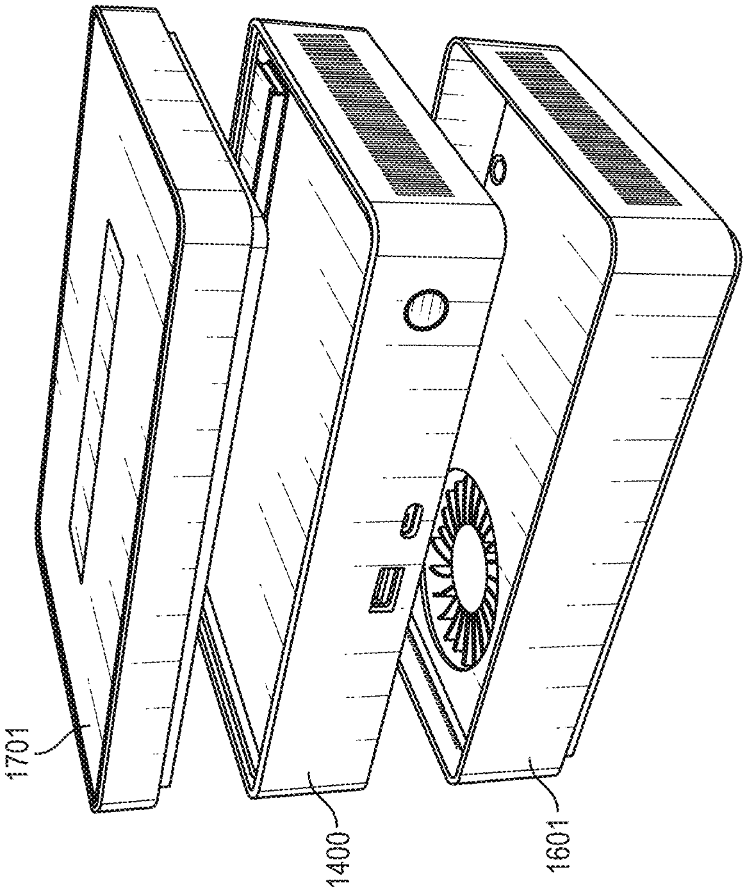
FIG. 18 is a diagram illustrating an exploded view of an example of an AI appliance including a base module, a floor module, and a top module according to various embodiments.

FIG. 16 is a diagram illustrating front view 1600 of an example of an AI appliance including base module 1400 and floor module 1601, FIG. 17 shows front view 1700 of floor module 1601, base module 1400, and top module 1701, and FIG. 18 shows exploded view 1800 of floor module 1601, base module 1400, and top module 1701.

In these examples, base module 1400, floor module 1601, and/or top module 1701 are vertically stacked. Particularly, a top portion of floor module 1601 may be coupled to a bottom portion of base module 1400 (e.g., recessed portion 1402), and a top portion of base module 1400 may be coupled to a bottom portion of top module 1701.

As shown, base module 1400 and top module 1701 may be present while floor module 1601 is absent. In other embodiments, a single base module 1400 may be coupled to multiple vertically stacked floor modules.

The example of a modular AI appliance as illustrated in FIGS. 14-18 may include a tool-less design that allows for a simple and quick method of assembly, including both signal connections and mechanical assembly. In some implementations, the scalable hardware expansion via vertical stacking aspect of the systems and methods described herein may provide a modular and interchangeable modular design with distributed performance, power, and/or thermal management across all modules.

Figure 19:
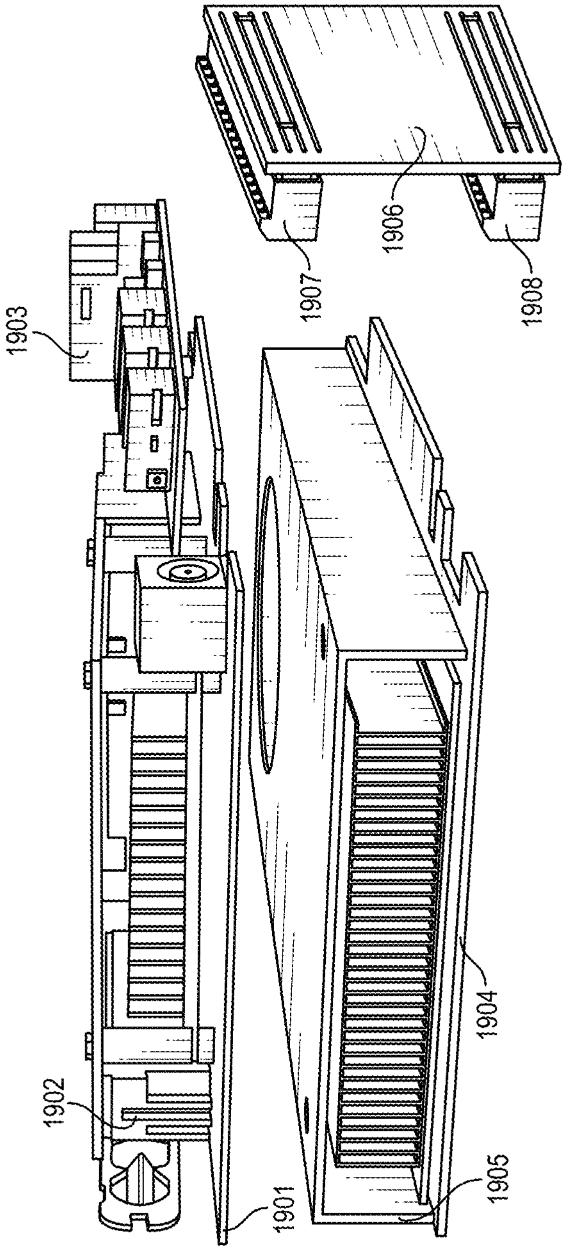
FIG. 19 is a diagram illustrating an example of a bridge decoupled from components of a floor module and a base module, according to various embodiments.
Figure 20:
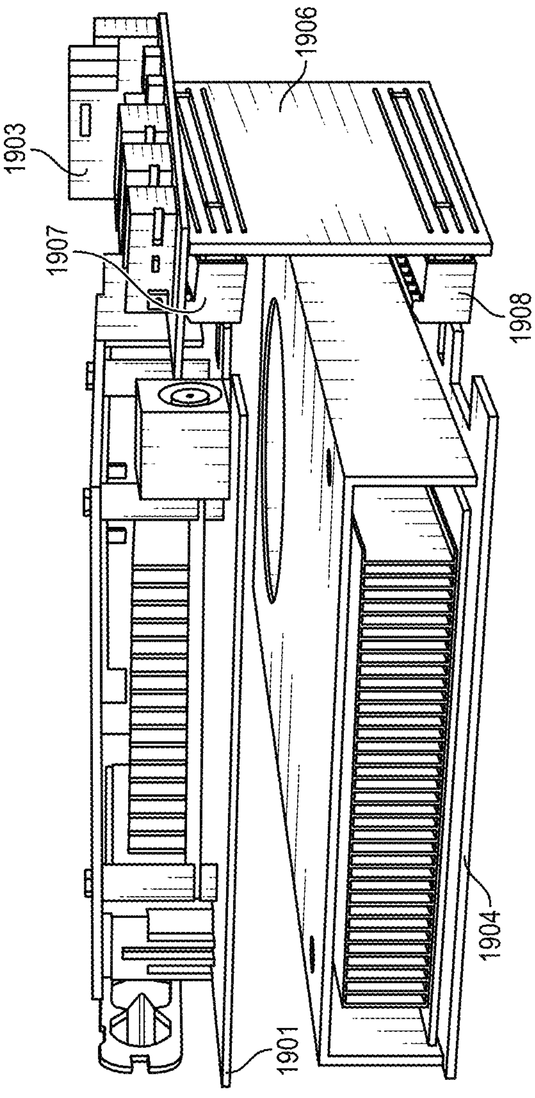
FIG. 20 is a diagram illustrating an example of a bridge coupling components of a floor module to a base module, according to various embodiments.

FIG. 19 is a diagram illustrating an example of a bridge decoupled from components 1900 of a floor module and a base module, and FIG. 20 illustrates view 2000 of the bridge coupled to the floor module and the base module. As shown, base module components may include base circuitry 1902 (e.g., implementing an SoC, etc.), and interchangeable I/O connection PCB portion 1903 (e.g., with connectors 1502, etc.) coupled to base Printed Circuit Board (PCB) 1901. Floor module components may include floor circuity 1905 (e.g., discrete AI accelerators, etc.) coupled to floor PCB 1904.

Meanwhile, the bridge includes connectors 1907 and 1908 coupled to each other via bridge PCB 1906. In some cases, bridge PCB 1906 may be perpendicularly disposed with respect to, and provide vertical support to, interchangeable I/O connection PCB portion 1903. In other cases, however, bridge PCB 1906 may be replaced with a cable. Each of connectors 1907 and 1907 may be operable for coupling onto corresponding connectors or traces on PCBs 1901 and 1904.

In various implementations, bridge 1906-1908 may facilitate the connection between a base module and a floor module. Bridge 1906-1908 may include both mechanical and electrical connection, providing a structure that holds PCBs 1901 and 1904 in place for stability and alignment. Electrically, bridge 1906-1908 may enable the transmission of power, data, and control signals between the base module and the floor module, for example, over a PCIe bus. This supports the identification and classification of each module by SoC 301, enabling AI appliance 103 to recognize and manage discrete AI accelerators 304A-N.

In various embodiments, when another module is coupled to a base module, the base module may initiate a process to identify the newly attached module. This identification process may include gathering detailed information about the module, including one or more of: its vendor, model, version, and the specific components it contains, such as any discrete AI accelerators, OS, firmware, etc. The base module may compile this information to create a comprehensive profile of the AI appliance's capabilities and specifications. Once the identification is complete, the base module may communicate this data to orchestrator 101, which uses this information to update its catalog, ensuring that the system's resource allocation and workload distribution are optimized based on the newly available capabilities.

Similarly, when a module is disconnected from an AI appliance, its base module may update orchestrator 101 with the change in configuration. This dynamic updating process allows orchestrator 101 to maintain an accurate and current catalog, enabling it to make informed decisions about resource management and system optimization. This seamless integration and disconnection process ensures that the AI appliance remains flexible and adaptable to changing requirements and configurations.

Figure 21:
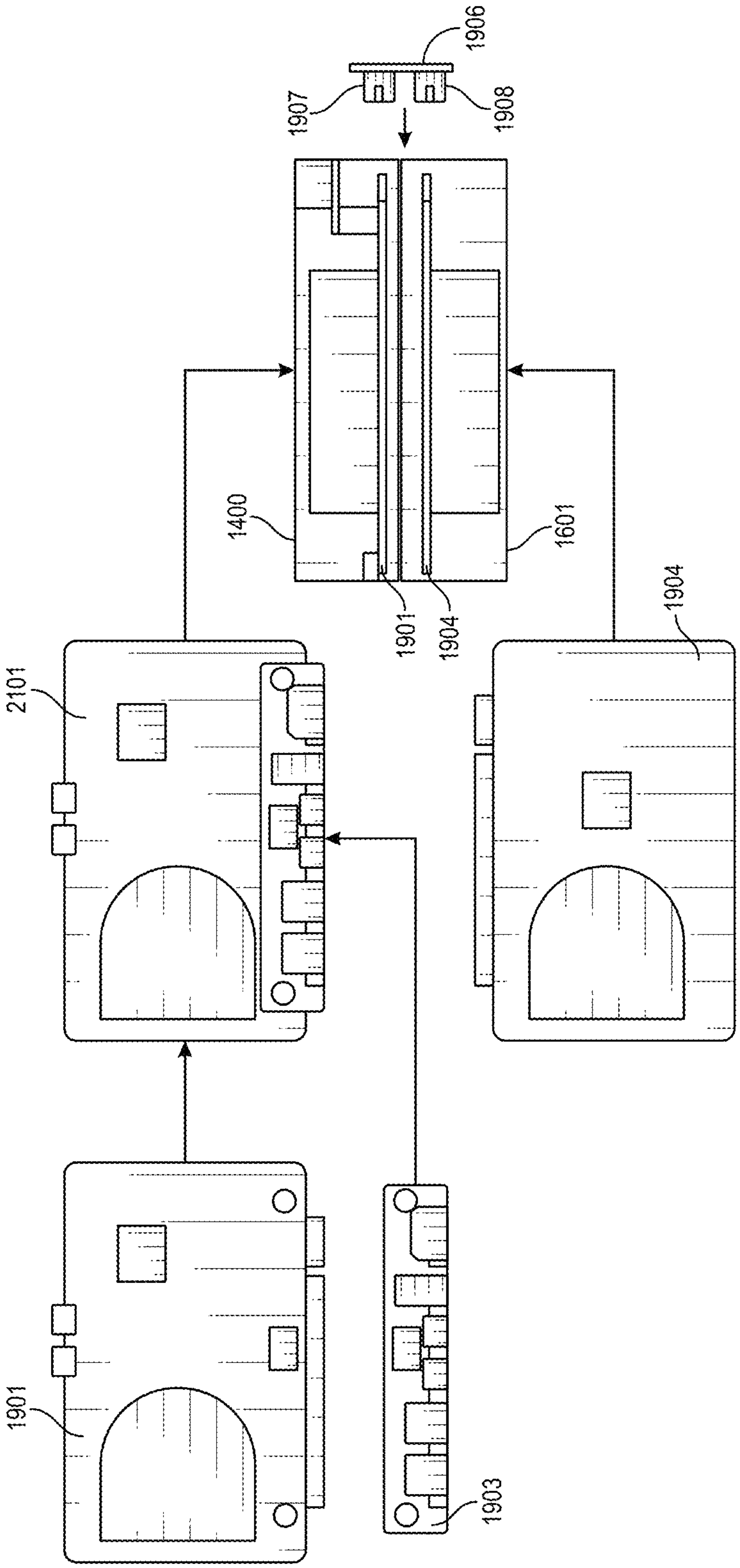
FIG. 21 is a diagram illustrating an assembly process of an example of a dual-module AI appliance, according to various embodiments.

FIG. 21 is a diagram illustrating assembly process 2100 of an example of a dual-module AI appliance, according to various embodiments. The diagram shows base PCB 1901 and the interchangeable Input/Output (I/O) connection PCB portion 1903 initially separate and then coupled to each other to form subassembly 2101. This subassembly 2101 constitutes base module 1400, which may then be coupled to the floor PCB 1904 via the bridge, which includes components 1906-1908, to complete the dual-module AI appliance. In this case, the final assembly 103 includes base module 1400 and floor module 1601.

Assembly process 2100 shows the modular design of the AI appliance, allowing for easy expansion and upgrading of its components. This modularity provides significant flexibility and scalability, enabling AI appliances to adapt to evolving technological advancements and user requirements.

As such, systems and methods described herein may enable the expansion of a base module to connect a plethora of floor modules for AI performance enhancement. This may include providing connections and a mechanical structure to facilitate the coupling of expansion modules to the base module. By modularizing an AI appliance to expand a base module to attach multiple floor modules, these systems and methods may enable a superset of discrete AI accelerators to connect to a base node with awareness for module identification and classification.

Having discussed the example architectures, devices, aspects, and implementations shown in FIGS. 1-21, we now turn our attention more specifically to systems and methods for managing and distributing power in a modular AI appliance.

Particularly, in modular AI appliances, the integration of additional modules, such as floor or top modules, often results in increased power requirements that exceed the capacity of the base node's existing power solution. This creates a challenge in efficiently managing and distributing power to accommodate the enhanced capabilities of the attached modules without overburdening the base device.

To address these, and other concerns, systems and methods described herein includes a power architecture that: (a) mechanically blocks a base module's power adapter port to prevent its use, (b) provides a new power port specifically for the attached module, and/or (c) incorporates additional circuitry within certain modules (e.g., floor modules) to support both its increased power requirements and those of the base module. In various embodiments, these techniques may increase in the total available power for the AI appliance (based on the attached module), selectively reroute the power path as needed, and/or leverage the existing power path with an enhanced modular power path, without placing additional strain on the base module.

Figure 22:
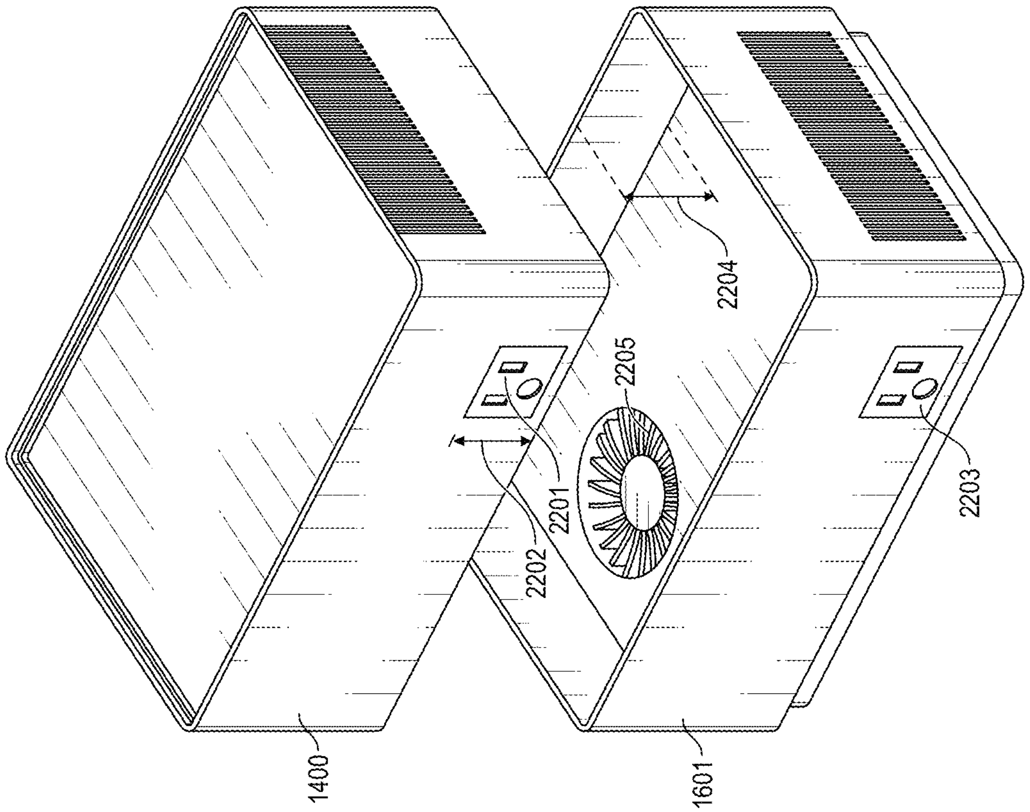
FIG. 22 is a diagram illustrating an exploded view of an example of an AI appliance including a base module and a floor module with power management features, according to various embodiments.

FIG. 22 is a diagram illustrating exploded view 2200 of an example of an AI appliance including base module 1400 and floor module 1601 with power management features. In this case, base module 1400 is equipped with base power connector, inlet, or plug 2201 positioned at specific height 2202 along the side of the base module. In various embodiments, an AC wire or power adaptor may be plugged into power plug 2201 to power the base module (e.g., less than 10 W).

Floor module 1601 includes a bay of depth 2204 designed to receive base module 1400. Depth 2204 is equal to or greater than height 2202 of the base power connector, so that when base module 1400 is inserted into floor module 1601, base power connector 2201 is concealed within the AI appliance. This design effectively prevents the use of the base power connector, thereby rerouting the power supply to floor connector or plug 2203, which becomes the sole accessible power input for the AI appliance (e.g., more than 25 W).

As such, this configuration not only optimizes power management by directing power through the floor module but also enhances the aesthetic and functional design by concealing unnecessary connectors. In this example, floor module 1601 also includes a fan or heatsink 2205, which is strategically positioned to be shared between components across both the top and floor modules. This shared thermal management system promotes efficient heat dissipation, maintaining operating temperatures for the AI appliance.

In other embodiments, other components such as connectors, ports, buttons, and/or displays located may be similarly blocked or concealed upon insertion of base module 1400 into floor module 1601. This approach ensures that these elements are not only protected from external access but also contributes to a streamlined and cohesive appearance of the AI appliance. Moreover, by concealing these components, this design may reduce potential points of failure or damage, as they are shielded from environmental factors and physical interference, as well as enhance the security of the device by limiting access to critical interfaces and controls, thereby reducing the risk of unauthorized use or tampering.

Furthermore, this configuration supports a more efficient and organized layout, as it reduces cable clutter and the need for external connections, relying instead on the internal architecture of the AI appliance for connectivity and control. These features align with the modular and scalable nature of the AI appliance, allowing for easy upgrades and integration of new technologies while maintaining a clean and professional aesthetic.

Figure 23:
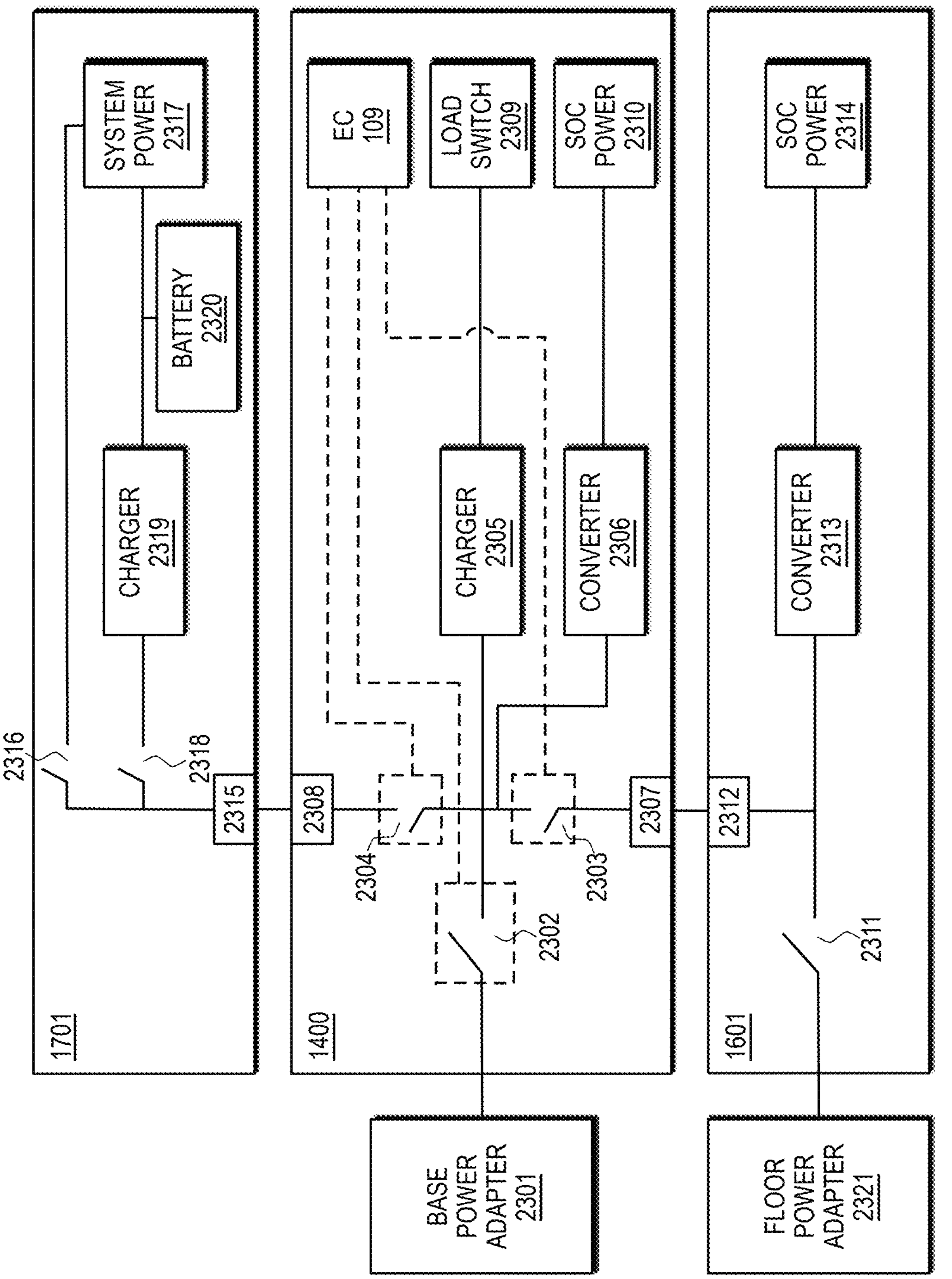
FIG. 23 is a diagram illustrating an example of a power management and distribution system in an AI appliance, according to various embodiments.

FIG. 23 is a diagram illustrating an example of power management and distribution system 2300 in AI appliance 103. In various embodiments, base module 1400 includes power adapter switch 2302 coupled to power adapter 2301 (e.g., an AC adapter). EC 109 may be integrated into, or coupled to SoC 301, and it may be configured to control to: power adapter switch 2302, floor module switch 2303, and/or top module switch 2304 to perform or more power distribution and/or management operations.

Base module 1400 also includes charger 2305 coupled to power adapter switch 2302 and load switch 2309. In various embodiments, charger 2305 (e.g., a narrow voltage DC or "NVDC" charger) be responsible for regulating and supplying power to electrical loads of the AI appliance and/or coupled thereto. It may be designed to convert incoming power from an external source, such as a base power adapter 2301, into a form suitable for use by the appliance's components.

Charger 2305 may be capable of managing power distribution to ensure that all components receive the necessary power for optimal operation, and it may include features for battery charging if the appliance is equipped with a battery. Additionally, charger 2305 may be integrated load switch 2309 to selectively direct power to different parts of the appliance based on the current configuration and power requirements.

Base module 1400 further includes power converter 2305 (e.g., a buck converter or the like) coupled to power adapter switch 2302 and SoC power terminal 2210, configured to power SoC 301. In various implementations, power converter 2305 efficiently reduces the input voltage from base power adapter 2301 to the specific voltage levels required by SoC 301, discrete AI accelerators 304A-N, and other modules; such as top module 1701.

Meanwhile, floor module 1601 includes switch 2311 coupled to floor power adapter 2321. In operation, power converter 2313 provides SoC power 2314 to a SoC, discrete AI accelerator, base module 1400, and/or top module 1701. In various embodiments, the power capabilities of floor power adapter 2321 may be greater than the power capabilities of base power adapter 2301, such that floor module 1701 may power the entire AI appliance.

Top module 1701 includes switch 2316, which provides power to system power terminal 2317, for example, to power one or more controllers, loudspeakers, displays, etc. Furthermore, switch 2318 provides power to charger 2319, which charges internal battery 2320, also coupled to system power terminal 2317. In this manner, top module 1701 may charge while coupled to base module 1400, and subsequently used wirelessly (e.g., during a conference call, etc.).

As shown, connector 2315 of top module 1701 may be coupled to connector 2208 of base module, and connector 2307 of base module may be coupled to connector 2312 of floor module 1601. For example, connectors 2315 and 2308 may be pogo connectors, and connectors 2307 and 2308 may be coupled to connectors 1907 and 1908 of bridge PCB 1906.

In various embodiments, EC 109 may be designed to manage power distribution by both receiving commands from SoC 301 and/or independently detecting the coupling or decoupling of modules 1601 and 1701. For example, in some cases, EC 109 may communicate with SoC 301 through a dedicated communication interface, such as an Inter-Integrated Circuit (I2C) or Serial Peripheral Interface (SPI) bus.

Through this communication channel, SoC 301 may send specific commands to the EC 109 regarding power management, for example, using a context-based policy or the like. These commands may include instructions to enable or disable specific switches, such as switches 2302, 2303, and 2304, to optimize power distribution based on the current operational state or configuration of the AI appliance.

Alternatively, EC 109 may autonomously identify when floor module 1601 or top module 1701 is coupled or decoupled from base module 1400. This detection may be facilitated through GPIO pins, mechanical switches, sensors, and/or controlling switches 2302, 2303, and 2304. As such, upon receiving commands from the SoC or detecting a change in module configuration, the EC 109 may autonomously control power management and distribution system 2300.

In some cases, EC 109 may adjust power management and distribution system 2300 by enabling or disabling switches 2302, 2303, and 2304 to ensure that power is efficiently distributed according to the new configuration. This may involve rerouting power to accommodate the increased power requirements of attached modules or optimizing power flow to maintain the appliance's performance and reliability. By combining the ability to receive commands from the SoC and independently detect module changes, the EC 109 effectively manages power distribution, such that the AI appliance may operate efficiently and adapt to varying configurations.

Figure 24:
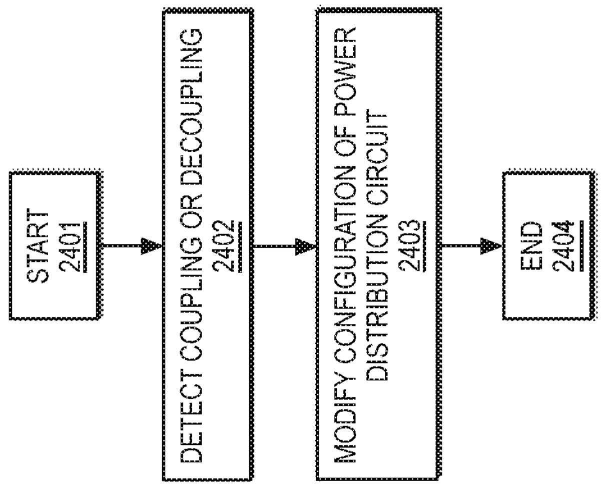
FIG. 24 is a diagram illustrating an example of a power management and distribution method, according to various embodiments.

FIG. 24 is a diagram illustrating an example of power management and distribution method 2400. In various embodiments, method 2400 may be performed, at least in part, by SOC 301 of base module 1400. Particularly, method 2400 outlines a process for power management and/or distribution, specifically focusing on the interaction between the base module and additional modules.

Method 2400 starts at 2401. At 2402, SoC 301 of base module 1400 may determine whether a floor module and/or a top module have been coupled to or decoupled from AI appliance 103. As such, SoC 301 may determine the current configuration of the AI appliance and make necessary adjustments to power management and distribution system 2300. In some cases, these changes may be determined by policy. For example, a context-based rule issued by orchestrator 101 may prescribe that one or more power management actions be performed by SoC 301 in response to the coupling or decoupling of modules, as well as thermal and/or performance metrics of the AI appliance.

Once SoC 301 identifies the presence or absence of these modules, method 2400 moves to 2403. Here, SoC 301 modifies the power management circuit, which may involve adjusting switches or other components within the circuit. This dynamic adjustment ensures that the AI appliance operates efficiently, and that power is distributed appropriately based on the current configuration, for example, based on the policy.

For example, SoC 301 may base module to at least one of: (a) disable a first portion of a power distribution circuit; or (b) enable a second portion of the power distribution circuit. The first portion of the power distribution circuit may include a power adapter input, switch, or plug. Additionally, or alternatively, the second portion of the power distribution circuit may include a floor module power switch.

In some cases, the power distribution circuit may include a converter coupled to the SoC, and selectively coupled to a power adapter input or a floor module power input. Additionally, or alternatively, the power distribution circuit may include a charger coupled to a load switch, and the converter may be selectively coupled to a power adapter input or a floor module power input.

One or more discrete AI accelerators may be coupled to the load switch. In some cases, in response to detection of the top module, SoC 301 may enable a third portion of the power distribution circuit. For example, the third portion of the power distribution circuit may include a top module power switch that selectively charges a battery. Finally, method 2400 concludes at 2404.

As such, method 2400 allows AI appliance 103 to adapt to changes in its modular configuration. By detecting whether these modules are coupled or decoupled, the base module modifies the power management circuit, which may involve enabling or disabling specific portions thereof via one or more switches. This enables AI appliance 103 to efficiently meet the power requirements of the attached modules without overburdening the base module. SoC 301 may reroute power as needed, leveraging an enhanced modular power path to increase the total available power, thereby optimizing the appliance's performance and maintaining its operational reliability.

Having discussed the example architectures, devices, aspects, and implementations shown in FIGS. 1-24, we now turn our attention more specifically to systems and methods for managing client IHS access to components of a modular AI appliance.

In various embodiments, systems and methods described herein may provide an architecture for a distributed AI compute appliance, designed to locally and remotely manage multiple discrete AI accelerators with tethered (local) and/or remote access. Such architecture may allow for: tethered (via PCIe), physical (via ethernet), and/or wireless data and management access to control and arbitrate management tasks and AI workloads or tasks across multiple AI accelerators. These systems and methods may dynamically arbitrate the access and availability of AI accelerators to local or remote client IHSs via SoC 301 and/or orchestrator 101. They may also provide access (e.g., USB, Thunderbolt, etc.) to external AI accelerators, other SoCs, and conference speakers within the AI appliance (e.g., in a top module).

Systems and methods described herein may also address the problem of adding a multiplexer between SoC 301 and client IHS 107 so that the AI appliance may output its own display signal to an external monitor, for example. For instance, these systems and methods may tunnel a DisplayPort (DP) signal from SoC 301 through the AI appliance's local port controller, using the host path for video output, thereby reducing system cost and complexity.

Figure 25:
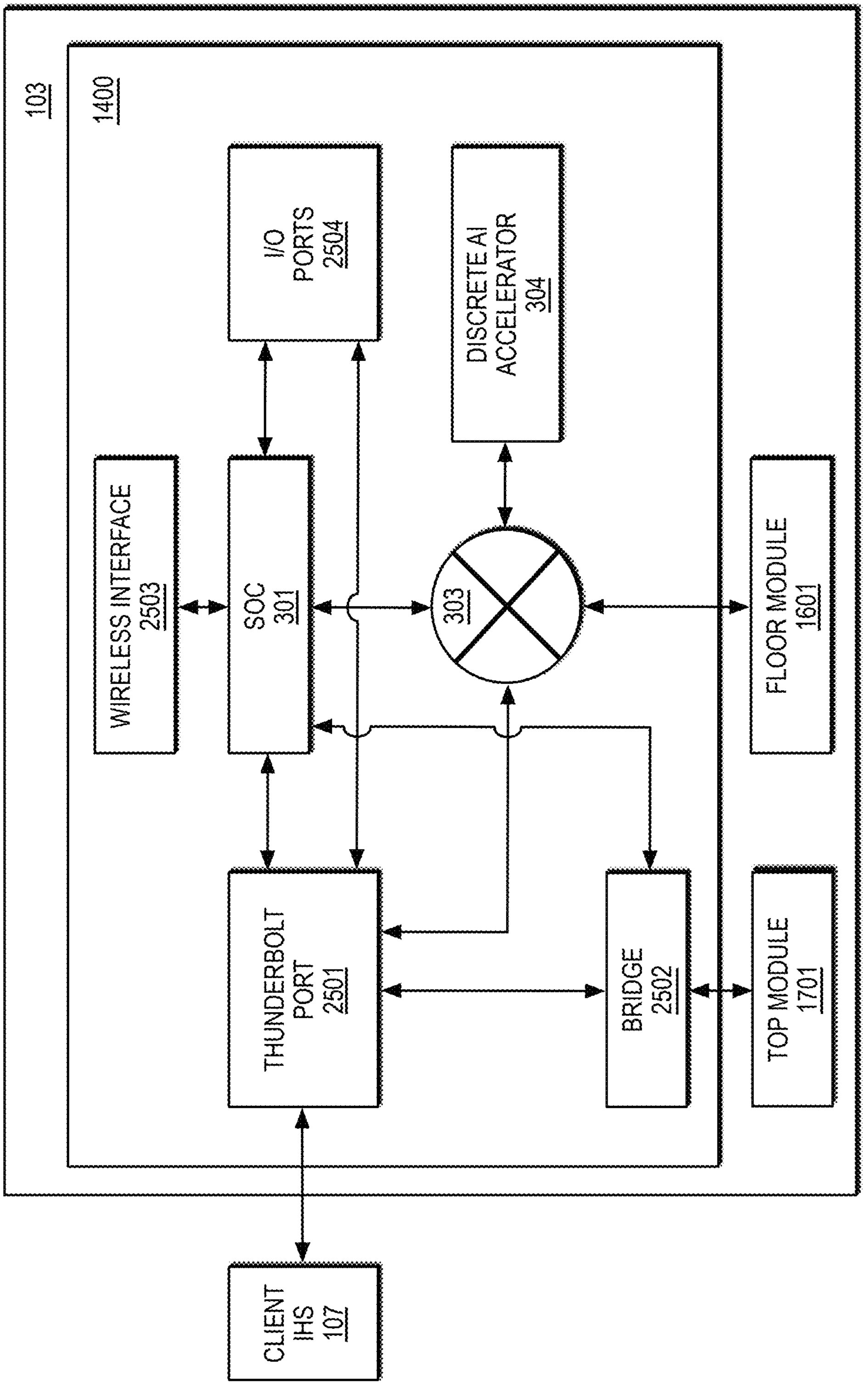
FIG. 25 is a diagram illustrating an example of a modular AI appliance configured to manage client IHS access to components thereof, according to various embodiments.

To illustrate this, FIG. 25 is a diagram showing an example of a modular AI appliance 2500 configured to manage client IHS 107 access to components thereof. In this example, SoC 301 is coupled to Thunderbolt port or controller 2501, I/O ports or controllers 2504, and wireless interface or controller 2503. In other embodiments, port or controller 2501 may be any other local port or controller (e.g., USB, Ethernet, etc.).

As shown, SoC 301 is coupled to crossbar 303, usable to manage local client IHS 107's access to AI accelerators 304 and/or in floor module 1601. Floor module 1601, typically housing additional discrete AI accelerators, is also connected to crossbar 303, facilitating efficient management of AI workloads by SoC 301 and/or local client IHS 107 (in some case directly, bypassing SoC 301 via port 1501). Additionally, top module 1701 may be coupled to SoC 301 and port 1501 via bridge or controller 2502 (e.g., a USB bridge, or the like).

In operation, SoC 301 may execute program instructions stored in its memory, allowing it to establish a connection with local client IHS 107 and control the client IHS's access to AI accelerator 304, floor module 1601, and/or top module 1701. For example, SoC 301 may configure crossbar 301 to provide either direct or indirect access to AI accelerator 304, floor module 1601, and/or top module 1701 depending upon the presence or proximity of a local user and/or client IHS 107.

In some cases, SoC 301 may evaluate context-based rules or policies, access a catalog of AI appliances, and/or execute routing commands provided by orchestrator 101 to control a local client IHS's 107 direct or indirect access to AI accelerator 304, floor module 1601, and/or top module 1701. This allows AI appliance 2500 to manage AI tasks, optimize resource allocation, and provide enhanced operations for both local and remote clients.

Figure 26:
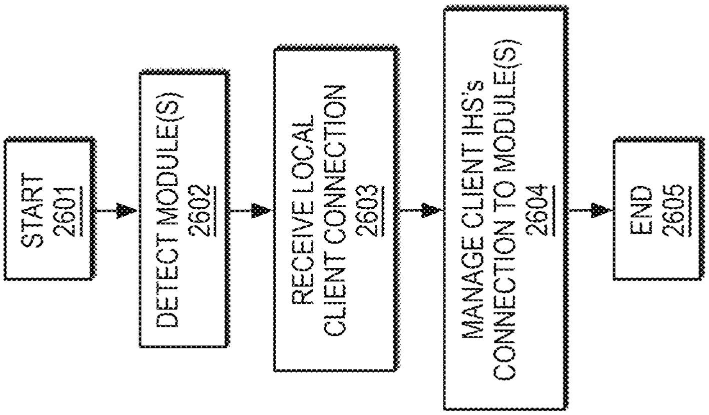
FIG. 26 is a flowchart illustrating an example of a method for managing client IHS access to components of a modular AI appliance, according to various embodiments.

FIG. 26 is a flowchart illustrating an example of method 2600 for managing client IHS access to components of a modular AI appliance. In various implementations, the client IHS may be a local client with respect to the AI appliance.

Particularly, method 2600 begins at 2601. At 2602, SoC 301 detects the presence of any modules connected to the AI appliance, such as a floor module or a top module, which may house additional AI accelerators or peripheral interfaces. Once the module(s) is/are identified, at 2603, the SoC receives a connection request from a local client IHS 107 via a local port.

At 2604, the SoC manages the client IHS's connection to the detected modules, configuring access to the AI accelerators and other resources as needed. Such management may involve configuring crossbar 303 to provide direct or indirect access to the AI accelerators, depending on the operational requirements and context-based policies. It may also involve configuring bridge 2502 to provide direct or indirect access to selected ones of a top module's resources. In some cases, at 2604, SoC 301 may evaluate context-based policies and/or access a catalog of AI appliances maintained by an orchestrator to determine whether to allow or block a client IHS's direct (via enumeration) and/or indirect access (through SoC 301) to various AI accelerators and controllers. Method 2600 ends at 2605.

Figure 27:
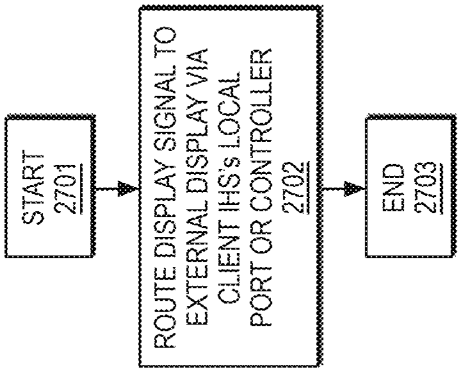
FIG. 27 is a flowchart illustrating an example of method for using a local port of a modular AI appliance to route a display signal, according to various embodiments.

FIG. 27 is a flowchart illustrating an example of method 2700 for using a local port of a modular AI appliance to route a display signal (e.g., a DP signal, or the like). As shown, method 2700 starts at 2701.

At 2702, SoC 301 routes a display signal to an external display via local port or controller 1501 using the multiplexing operations provided by the local port, thus removing the need for an additional multiplexer in the module's circuitry. For example, SoC 301 may send a display signal to port 2501, and port 1501 may forward that signal to I/O ports 2504, to which an external display may be coupled. Method 2700 ends at 2703.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Artificial Intelligence (AI) appliance, comprising:

a floor module comprising an AI accelerator; and a base module coupled to the floor module, the base module comprising a Systems-on-Chip (SoC) and a memory coupled to, or integrated into, the SoC, wherein the memory comprises program instructions stored thereon that, upon execution by the SoC, cause the SoC to:

establish a connection with a client Information Handling System (IHS) via a local port; and control the client IHS's access to the AI accelerator.

2. The AI appliance of claim 1, wherein the AI accelerator comprises at least one of: a Graphics Processing Unit (GPU), a Neural Processing Unit (NPU), a Field-Programmable Gate Array (FPGA), an Application-Specific Integrated Circuit (ASIC), or a Tensor Processing Unit (TPU).

3. The AI appliance of claim 1, wherein the AI appliance is part of a docking station.

4. The AI appliance of claim 1, wherein the local port comprises at least one of: a Universal Serial Bus (USB), Thunderbolt, Ethernet, or wireless controller.

5. The AI appliance of claim 1, wherein to control the client IHS's access to the AI accelerator, the program instructions, upon execution by the SoC, further cause the SoC to configure a crossbar to provide the client IHS with direct access to the AI accelerator.

6. The AI appliance of claim 5, wherein to control the client IHS's access to the AI accelerator, the program instructions, upon execution by the SoC, further cause the SoC to configure the crossbar to stop the direct access and provide the client IHS with indirect access to the AI accelerator through the SoC.

7. The AI appliance of claim 1, further comprising a top floor coupled to the base floor, wherein the top floor comprises a controller, and wherein the program instructions, upon execution by the SoC, further cause the SoC to configure a bridge to provide the client IHS with direct access to the controller.

8. The AI appliance of claim 7, wherein to control the client IHS's access to the AI accelerator, the program instructions, upon execution by the SoC, further cause the SoC to configure the bridge to stop the direct access and provide the client IHS with indirect access to the controller through the SoC.

9. The AI appliance of claim 7, wherein the top floor comprises a loudspeaker and a microphone, and wherein the controller is configured to interface with the loudspeaker and the microphone during a conference call.

10. The AI appliance of claim 1, wherein to control the client IHS's access to the AI accelerator, the program instructions, upon execution by the SoC, cause the SoC to evaluate a context-based policy provided by an Information Technology Decision Maker (ITDM).

11. The AI appliance of claim 1, wherein to control the client IHS's access to the AI accelerator, the program instructions, upon execution by the SoC, cause the SoC to access a catalog of AI appliances provided by an orchestrator in communications with a plurality of AI appliances.

12. The AI appliance of claim 1, wherein to control the client IHS's access to the AI accelerator, the program instructions, upon execution by the SoC, cause the SoC to execute a routing command provided by an orchestrator in communications with a plurality of AI appliances.

13. The AI appliance of claim 1, wherein the program instructions, upon execution, cause the SoC to execute route a display signal from the SoC to a display coupled to the AI appliance via the local port.

14. A method, comprising:

providing an Artificial Intelligence (AI) appliance comprising a Systems-on-Chip (SoC), an AI accelerator coupled to the SoC, and a memory coupled to, or integrated into, the SoC, wherein the memory comprises program instructions stored thereon that, upon execution by the SoC, cause the SoC to establish a connection with a client Information Handling System (IHS) via a local port; and routing a display signal from the SoC to a display coupled to the AI appliance via the local port.

15. The method of claim 14, further comprising configuring a crossbar to provide the client IHS with direct access to the AI accelerator.

16. The method of claim 15, further comprising configuring the crossbar to stop the direct access and provide the client IHS with indirect access to the AI accelerator through the SoC.

17. The method of claim 14, further comprising configuring a bridge to provide the client IHS with direct access to the controller.

18. The method of claim 17, further comprising configuring the bridge to stop the direct access and provide the client IHS with indirect access to the controller through the SoC.

19. A hardware memory device having program instructions stored thereon that, upon execution by a Systems-on-Chip (SoC) of an Artificial Intelligence (AI) appliance, the AI appliance comprising two or more discrete AI accelerators, cause the SoC to:

establish a connection with a client Information Handling System (IHS) via a local port;

control, by the SoC, a client IHS's access to the two or more discrete AI accelerators; and route a display signal from the SoC to a display coupled to the AI appliance via the local port.

20. The hardware memory device of claim 19, wherein to control the client IHS's access to the AI accelerator, the program instructions, upon execution by the SoC, cause the SoC to at least one of: evaluate a context-based policy provided by an Information Technology Decision Maker (ITDM); (b) access a catalog of AI appliances provided by an orchestrator in communications with a plurality of AI appliances; or (c) execute a routing command provided by an orchestrator in communications with a plurality of AI appliances.

* * * * *